United States Patent [19]

Tsai

[11] Patent Number: 5,642,446
[45] Date of Patent: Jun. 24, 1997

[54] APPARATUS FOR SWITCHING OPTICAL SIGNALS AMONG OPTICAL FIBERS

[76] Inventor: Jian-Hung Tsai, 10095 Bret Ave., Cupertino, Calif. 95014

[21] Appl. No.: 451,527

[22] Filed: May 26, 1995

Related U.S. Application Data

[63] Continuation-in-part of Ser. No. 28,304, Mar. 9, 1993, Pat. No. 5,436,986.

[51] Int. Cl.$^6$ ............................................. G02B 6/26
[52] U.S. Cl. .............................. 385/16; 385/18; 385/21
[58] Field of Search ................................. 385/16, 17, 18, 385/19, 20, 21, 22, 23

[56] References Cited

U.S. PATENT DOCUMENTS

| | | | |
|---|---|---|---|
| 4,208,094 | 6/1980 | Tomlinson, III et al. | 350/96.2 |
| 4,220,396 | 9/1980 | Antell | 350/96.15 |
| 4,239,331 | 12/1980 | Aoyama | 350/96.2 |
| 4,303,303 | 12/1981 | Aoyama | 350/96.2 |
| 4,322,126 | 3/1982 | Minowa et al. | 350/96.2 |
| 4,447,118 | 5/1984 | Mulkey | 350/96.16 |
| 4,452,507 | 6/1984 | Winzer | 350/96.2 |
| 4,626,066 | 12/1986 | Levinson | 350/96.18 |
| 4,789,215 | 12/1988 | Anderson | 350/96.19 |
| 4,790,621 | 12/1988 | Calaby et al. | 350/96.2 |
| 4,896,935 | 1/1990 | Lee | 350/96.2 |
| 4,938,555 | 7/1990 | Savage | 350/96.15 |
| 5,000,534 | 3/1991 | Watanabe et al. | 350/96.2 |
| 5,028,104 | 7/1991 | Kokoshvili | 350/96.15 |
| 5,042,889 | 8/1991 | Benzoni | 350/96.16 |
| 5,436,986 | 7/1995 | Tsai | 385/16 |

FOREIGN PATENT DOCUMENTS

| | | | |
|---|---|---|---|
| 2581204 | 10/1986 | France | 350/96.16 |
| 3147873 | 6/1983 | Germany | 385/22 |
| 58-72108 | 4/1983 | Japan | 385/25 |

*Primary Examiner*—Phan T. H. Palmer
*Attorney, Agent, or Firm*—Lyon & Lyon LLP

[57] ABSTRACT

An optical switch wherein mirrors move between two positions in order to transmit optical signals between input fibers and output fibers. In a first position, the optical signal is transmitted by input fibers through a one-quarter pitch of Grade Index Refractive (GRIN) lens. The light signal is then reflected by a first mirror and second mirror such that its path carries it to a focusing one-quarter GRIN lens, and to output fibers. With the mirrors in its second position, the optical signal is transmitted directly from input fibers, through one-quarter pitch of Grade Index Refractive (GRIN) lens, to a focusing one-quarter GRIN lens, and to output fibers, thereby resulting in an unreflected light signal path.

6 Claims, 22 Drawing Sheets

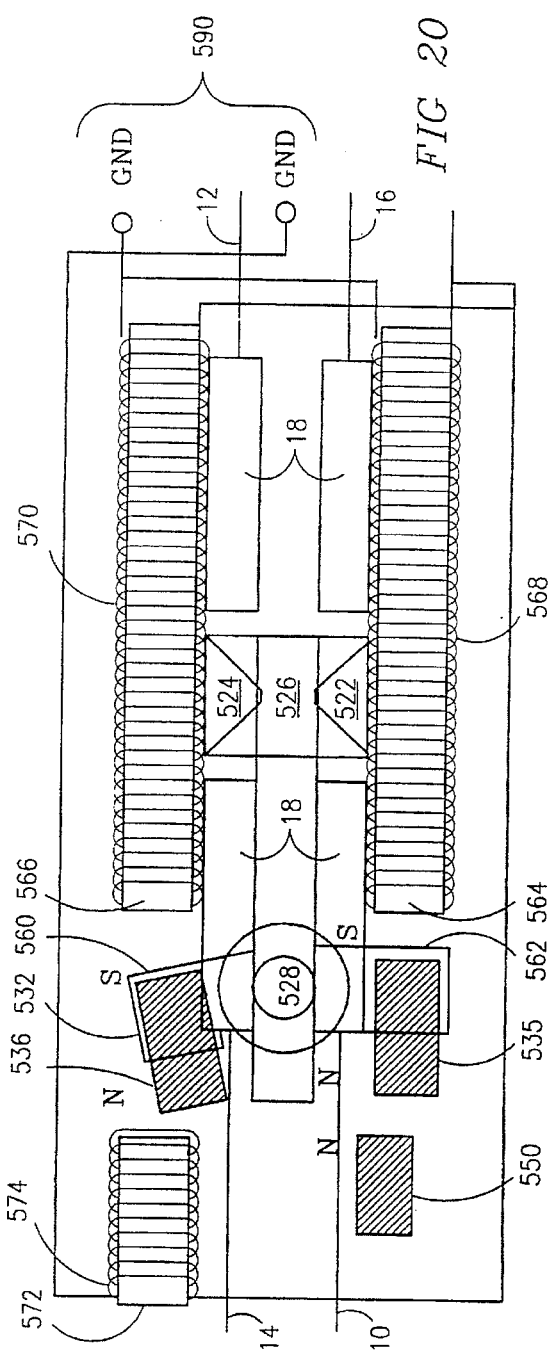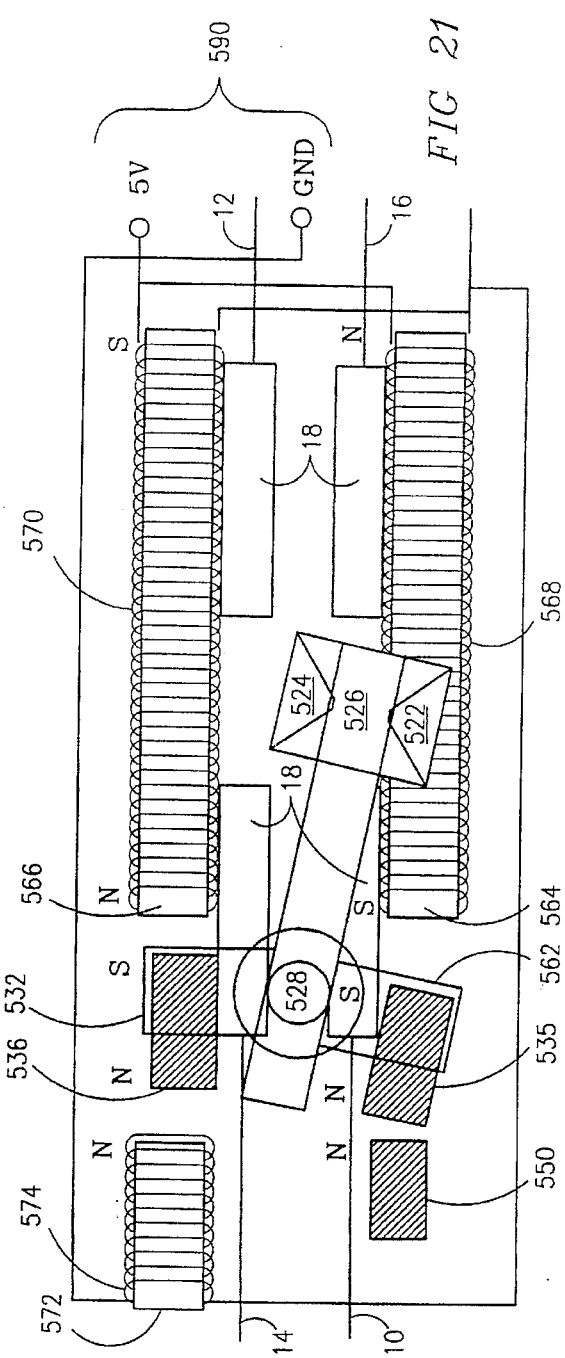

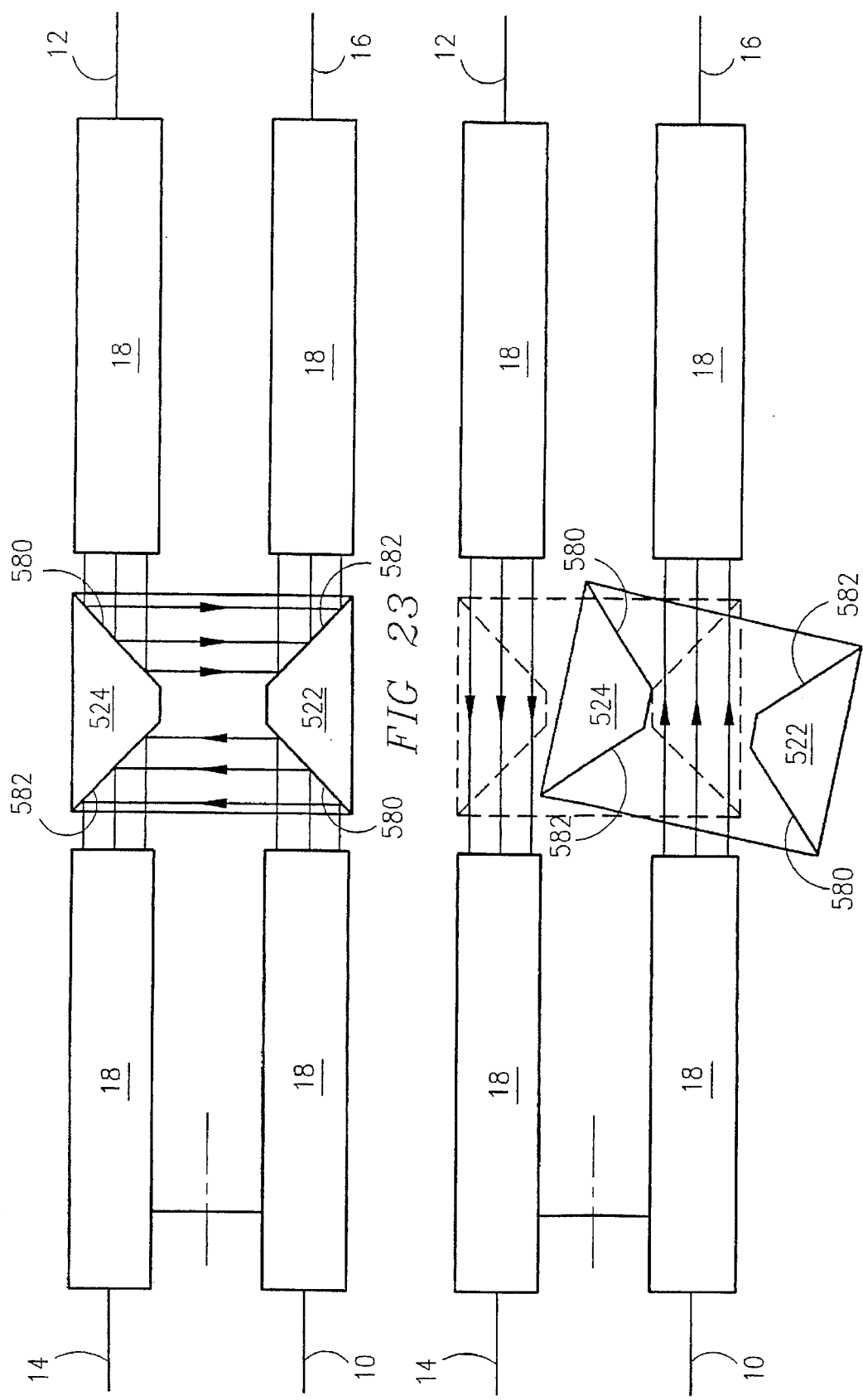

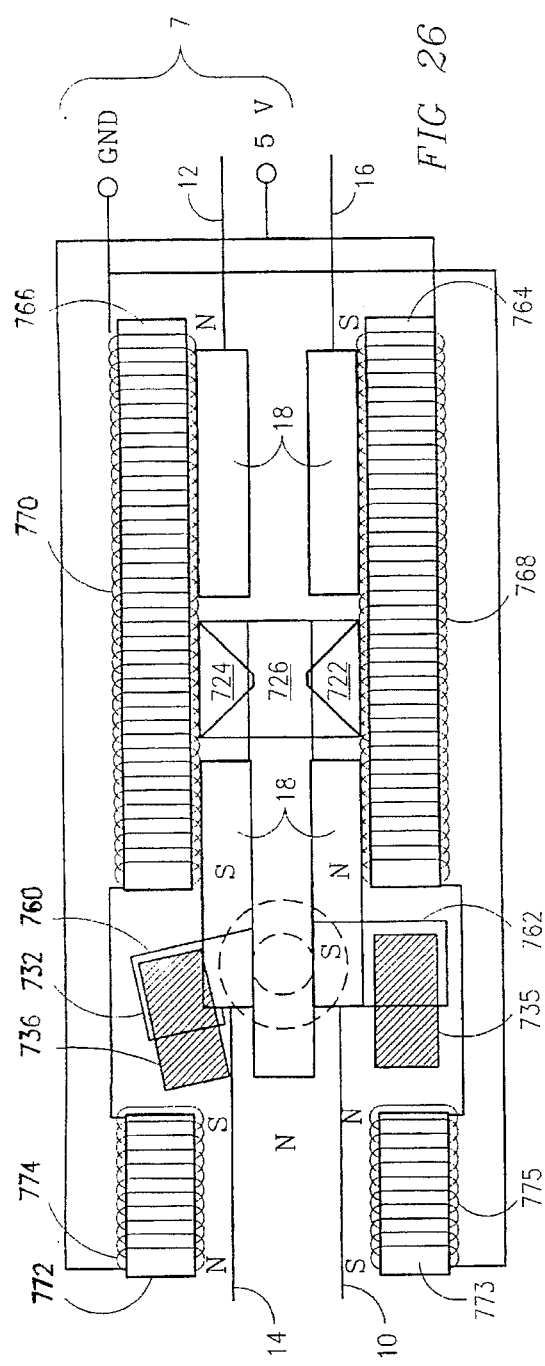
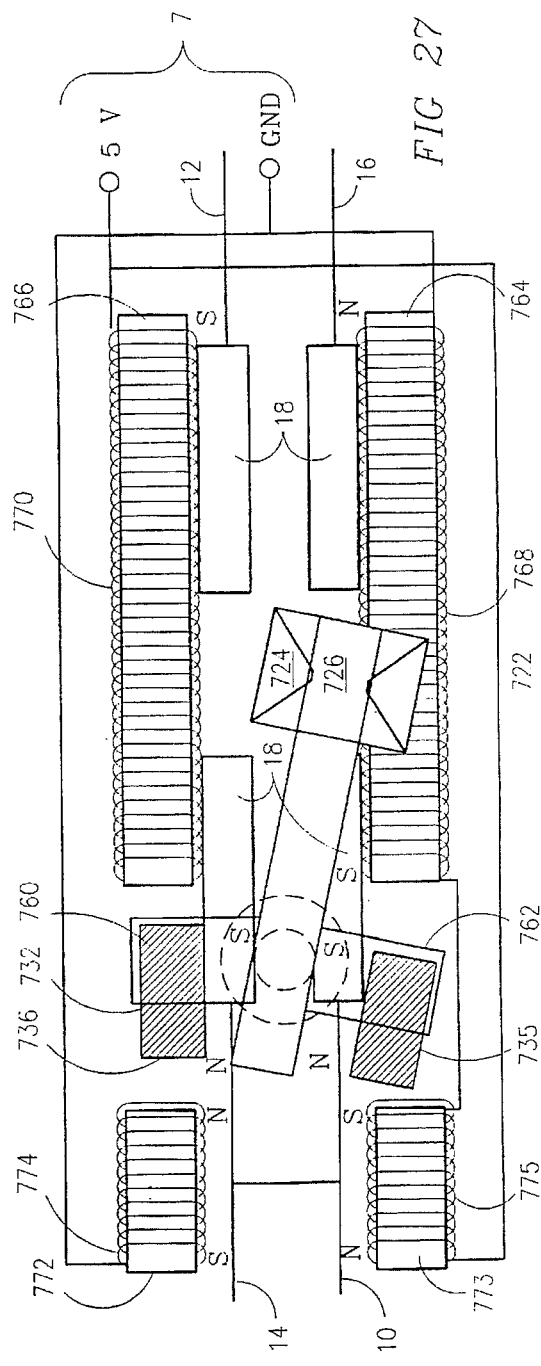

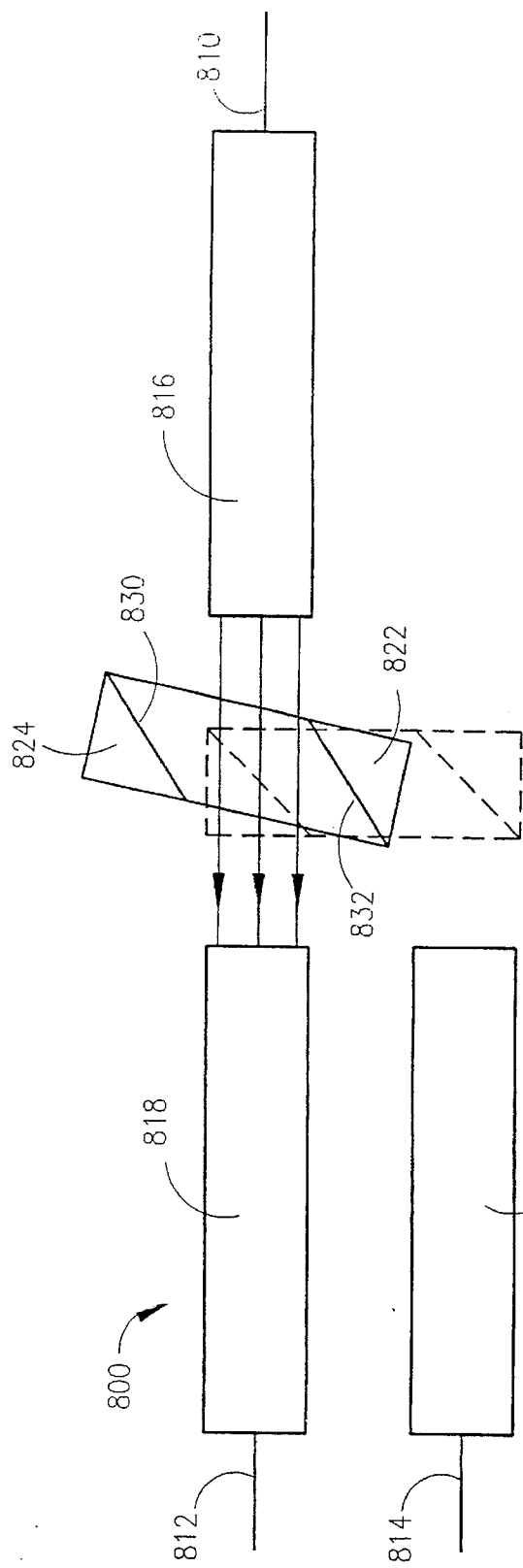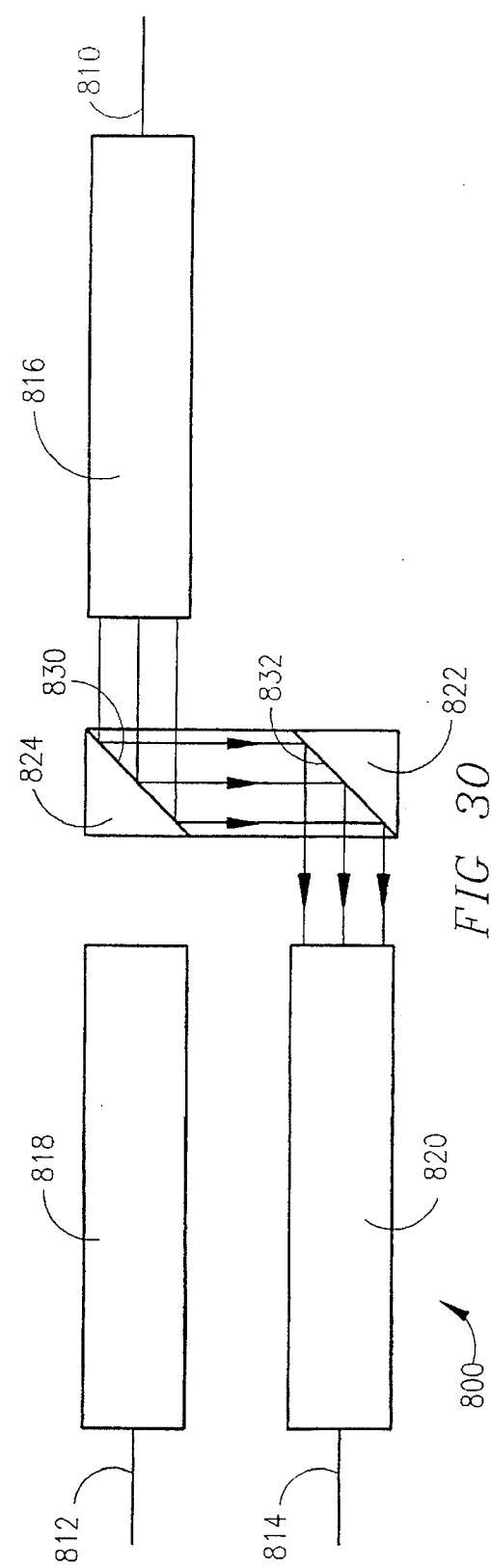

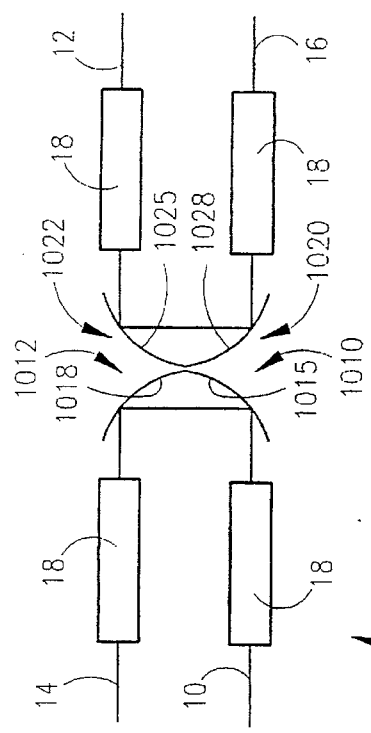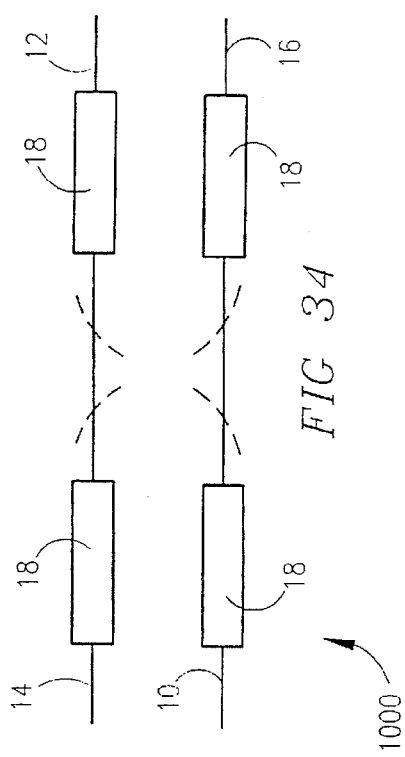

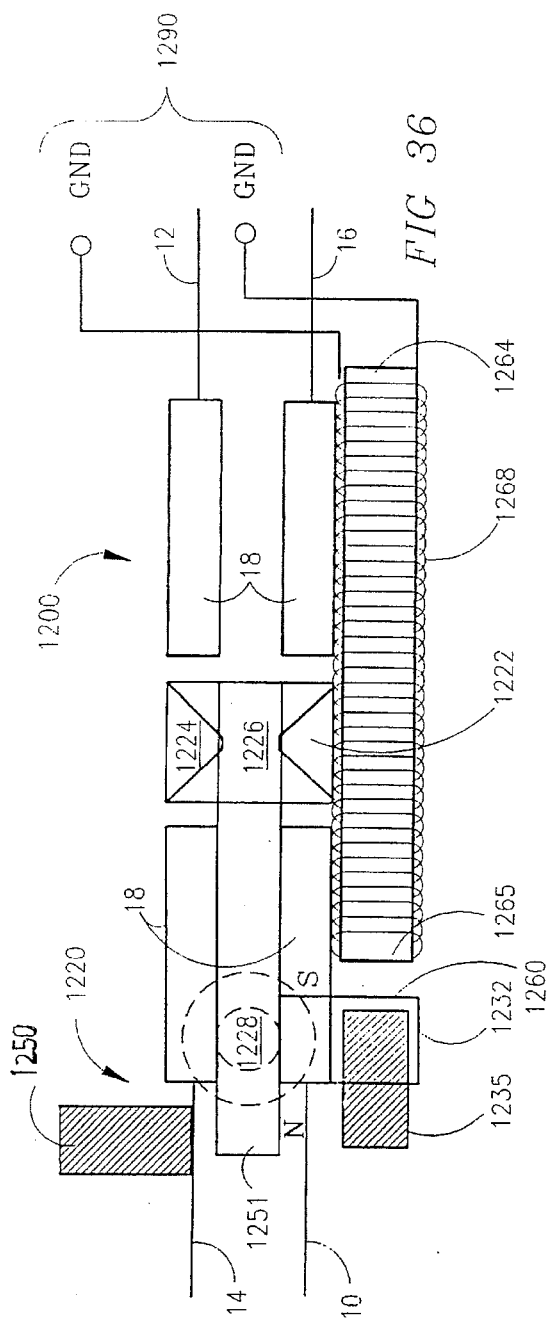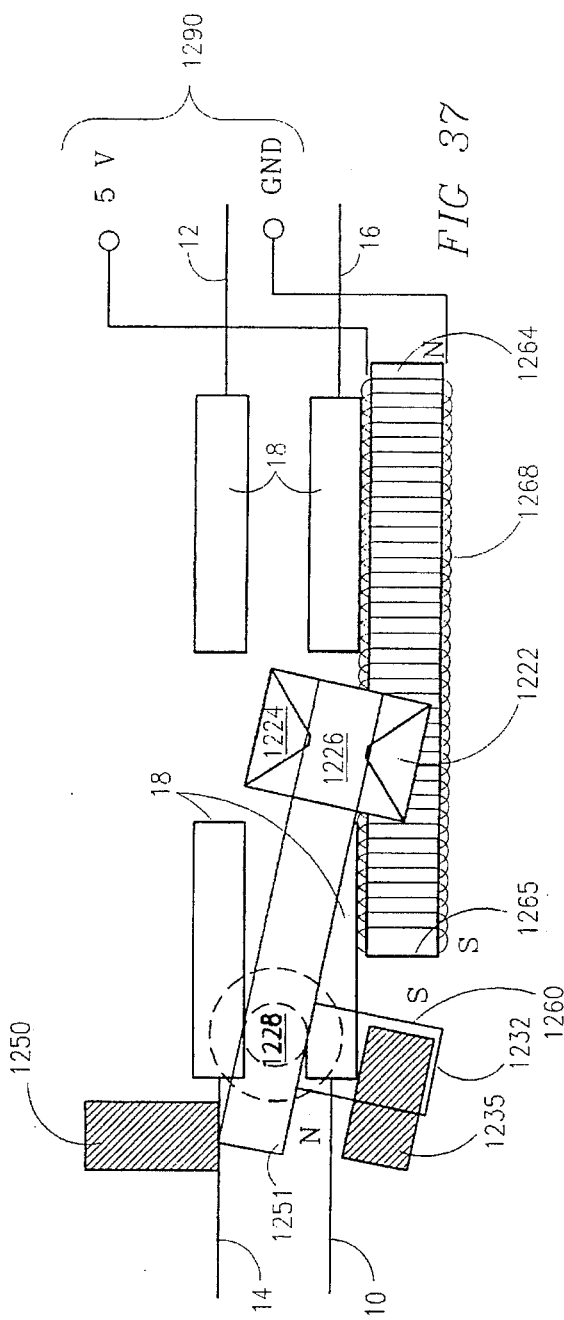

APPARATUS FOR SWITCHING OPTICAL SIGNALS AMONG OPTICAL FIBERS

CROSS-REFERENCE TO RELATED APPLICATIONS

This application is a continuation-in-part of application Ser. No. 08/028,304, filed Mar. 9, 1993 now U.S. Pat. No. 5,436,986.

BACKGROUND OF THE INVENTION

1. Field of the Invention

This invention relates generally to a fiber optic switch, and more particularly concerns a two-by-two fiber optic switch for use in Local Area Network (LAN) applications using an optical fiber dual ring system.

2. Description of the Prior Art

Modern Local Area Networks are experiencing increasing data transmission rates. The electrical signals traditionally used (either digital or analog) in LANs cannot satisfy the increased data transmission rates. Because of this, LANs are increasingly being constructed with optical fiber instead of more traditional electrical cables. Optical fiber cable is ideal for use in LANs because they can carry much larger quantities of data than traditional cable. Also, optical fiber cable does not create the electromagnetic interference (EMI) associated with electrical cable used in a LAN.

These optical fiber cables are connected by fiber optic switches. An optical fiber switch is used to change the optical path to allow transmission of data into the LAN, reception of data by a terminal from the LAN, or allow transmission of data around the LAN and the local (where data is transmitted between a transmission location to a receiving location), respectively.

By switching the optical switch between the inserted state (where data is either inserted or retrieved from the information ring) and bypass state (where data is transmitted inside the information ring), the two-by-two switch can change the optical path in the LAN. Optical signals from the information ring can also be isolated while the continuity of the information ring is maintained.

A de facto industrial standard known as fiber data distributed interface (FDDI) has developed that outlines basic requirements for fiber optic switches.

In optical fiber switches, either multi-mode fiber or single-mode fiber can be used. Regardless of what type of fiber is used, it has always been very difficult to align optical paths when bare fiber is used. Because fiber cores are so small, a misalignment of a few micrometers can cause large insertion losses. This is especially true when using single-mode fiber.

This misalignment problem has been addressed to some extent in the prior art through the use of a Grade Refractive Index (GRIN) lens. The GRIN lens makes the fiber act as if its core diameter has been enlarged to the size of the GRIN lens diameter, thereby making the fiber core diameter behave as if it was at least ten to one-hundred times larger. As a result insertion losses will be minimized when there is a few micrometers of misalignment between the light path from the input fiber to the output fiber. Inherent misalignments cannot be corrected thought the use of a GRIN lens.

Currently, there are two different technologies used to make optical fiber switches (exclusive of the integrated optic switch). A first is known as moving fiber. In this technology either the input optical fibers or the output optical fibers are actually reoriented to switch the light path between outputs. The second is known as moving prism or mirror. in this technology the refractive medium, i.e. the prism, or the mirror is reoriented to switch the light path between outputs while the fibers do not move. These prior art technologies, however, have suffered from slow switching speeds, unacceptable insertion losses and low stability (e.g. alignment problems).

An example of an optical system that uses a moving reflector assembly is disclosed in co-pending application, U.S. Ser. No. 08/028,398, by the same inventor as this application. It is hereby incorporated by reference in its entirety.

SUMMARY OF THE INVENTION

The present invention overcomes the problems and disadvantages of the prior art through the use of unique arrangements of high quality reflective surfaces and optical fibers. After the light signal leaves the input fiber, it is beamed directly, i.e., it does not pass through a refractive medium (other than air) before entering the output fiber. Also, the input and output fibers of the present invention are arranged such that both the reflected and unreflected light beams from the input fibers will be aligned with at least one output fiber. This eliminates to a large extent all losses and inherent stability problem associated with the current fiber optic switches.

A mechanism and reflector assembly of the invention switches the light path between fixed fibers, e.g., one input fiber and two output fibers or two input fibers and two output fibers, etc. The reflector assembly in one embodiment preferably comprises two triangular shaped mirrors and is mounted on a electromagnetically driven cylinder. With current applied to the mechanism the cylinder is linearly pushed or pulled to desired locations demarked for example by a stopper assembly. Because of the manner of mounting the reflector assembly on the cylinder, it moves as the cylinder moves.

When current is applied in one direction the cylinder is driven to a first position. In this position the reflectors interrupt the light path and cause the light signals to be transmitted to the desired output fiber. When current is applied in the opposite direction, the cylinder and hence the reflector assembly is moved to a second position. In this second position, the reflector assembly is moved out of the light path, allowing the light signal to be transmitted unimpeded to the output fiber optically aligned with the input fiber. Depending on the size, shape and position of the reflector assembly, any fiber can be "switched" to optically connect it to any other fiber without the need to pass the light through a refractive medium.

In another embodiment of the invention, the reflector assembly is rotatably pushed or pulled to desired location. An armature which is pivotably supported connects the reflector assembly to the cylinder generating rotational movement. The armature is disposed in a pivot formed on the cylinder. Movement of the cylinder causes the armature to move as well, which in turn causes the reflector assembly to follow a circular arc. In this embodiment the reflector assembly preferably comprises a first triangular mirror and a second triangular mirror. The "switching" of the light paths of this rotary embodiment can be accomplished in essentially the same way as in the linear embodiment. The main difference is the manner of movement of the reflector assembly. In the linear embodiment, the reflector assembly, as discussed above, is positioned through linear movement. In the rotary embodiment, the reflector assembly is positioned through rotary movement.

In a another embodiment of the invention, a biasing force can be added with the basic configuration being similar to the linear embodiment. The biasing force acts to hold the cylinder in a "home" position when no current is applied. When current is applied, the biasing force is overcome and the cylinder, and hence the reflector assembly, is moved from its "home" or first position to a second position. When current is removed, the biasing force moves the cylinder and hence the reflector assembly back to the "home" or first position without the need to apply current in the appropriate direction.

In yet another embodiment of the invention, torsional biasing force has been added to a structure similar to that of the rotary embodiment. The torsional biasing force holds the cylinder in a first position when no current is applied to the system. In the rotary embodiment, the reflector assembly is rotatably mounted. Hence, when the cylinder is in its first position, the reflector assembly is also in its first position. When current is applied, the cylinder is driven to the second position. When the magnetic cylinder has been moved, the armature mounted thereon moves the reflector assembly in a circular fashion from its first (or initial) position to a second position. When the current is removed from the coil, the torsional biasing force moves the cylinder and hence the reflector assembly back to the first position.

A feature of one aspect of the present invention, therefore, is the provision of a fiber optic switch comprising an input fiber, a first output fiber and a second output fiber. The first input fiber is arranged so that it is collinear with the second output fiber and adjacent and parallel the first output fiber. When the reflector assembly is moved the light emanating from the input fiber may be redirected from one output to the other output without the light beam passing through a refractive medium.

In one application, the invention may be incorporated in a two-by-two fiber optic switch. In this application the switch IS comprises a moving means for moving the reflector assembly to a first position or a second position. If appropriate GRIN lens can be placed at the end of each fiber. When the reflector assembly is between the first input fiber and the second input fiber, it is in the first position. When the reflector assembly is in the first position, a light signal transmitted from the first input fiber, through the GRIN lens (if used) on the first input fiber is reflected to the GRIN lens (if used) on the first output fiber. When the reflector assembly is in the second position, a light signal transmitted from the first output fiber travels directly to the GRIN lens (if used) on the second output fiber, thereby travelling unreflected by the reflector assembly.

The above and other features of the invention, including various novel details of construction and combination of parts, will now be more particularly described with reference to the accompanying drawings and pointed out in the claims. It will be understood that the particular device embodying the invention are shown by way of illustration only and not as limitations of the invention. The principles and features of this invention may be employed in various and numerous embodiments without departing from the free spirit of the invention.

BRIEF DESCRIPTION OF THE DRAWINGS

Reference is made to the accompanying drawings in which are shown illustrative embodiments of aspects of the invention, from which novel features and advantages will be apparent.

FIG. 20 is a schematic view of the two-by-two fiber optic switch shown in FIGS. 18 and 19 with the reflector assembly in a first position.

FIG. 21 is a schematic view of the two-by-two fiber optic switch shown in FIGS. 18 and 19 with the reflector assembly in a second position.

FIG. 23 is a top view of the two-by-two fiber optic switch of FIGS. 18–21 showing optical light paths when the reflector assembly is in a first position.

FIG. 24 is a top view of the two-by-two fiber optic switch of FIGS. 18–21 showing optical light paths when the reflector assembly is in a second position.

FIG. 26 is a schematic view of the two-by-two fiber optic switch shown in FIG. 25 with the reflector assembly in a first position.

FIG. 27 is a schematic view of the two-by-two fiber optic switch shown in FIG. 25 with the reflector assembly in a second position.

FIG. 29 is a top schematic view of one-by-two fiber optic switch embodiment of the present showing optical light paths when the reflector assembly is in a second position.

FIG. 30 is a top schematic view of one-by-two fiber optic switch embodiment of the present showing optical light paths when the reflector assembly is in a first position.

FIG. 33 is a top schematic view of a two-by-two fiber optic switch embodiment of the present invention showing optical light paths when an alternative mirror arrangement is in a first position.

FIG. 34 is a top schematic view of a two-by-two fiber optic switch embodiment of the present invention showing optical light paths when an alternative mirror arrangement is in a second position.

FIG. 36 is a schematic view the two-by-two fiber optic switch shown in FIG. 35 with the reflector assembly in a first position.

FIG. 37 is a schematic view of the two-by-two fiber optic switch shown in FIG. 35 with the reflector assembly in a second position.

DETAILED DESCRIPTION OF THE DRAWINGS

Figure 1:
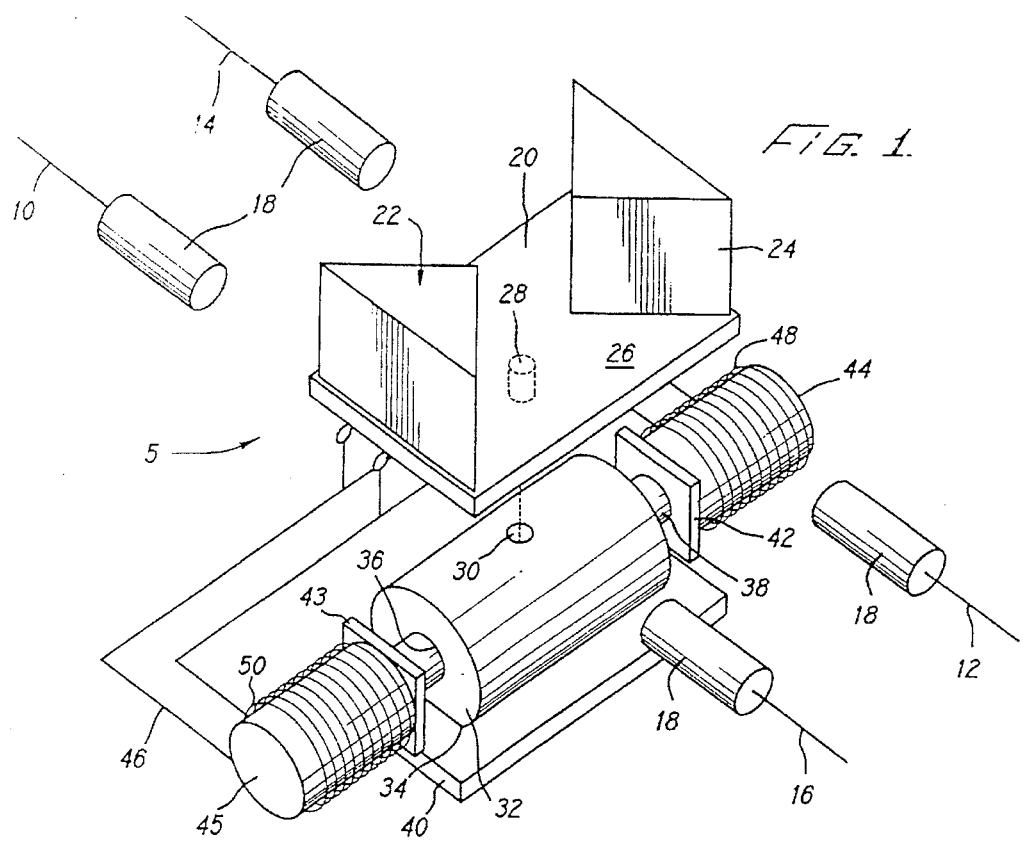
FIG. 1 is a perspective view of an embodiment of a two-by-two fiber optic switch incorporating aspects of the invention.

Referring to the drawings, and in particular, FIG. 1, there is shown a first embodiment of a two-by-two fiber optic switch 5 incorporating aspects of the invention. The switch 5 has four optical fibers, a first input fiber 10, a second input fiber 12, a first output fiber 14 and a second output fiber 16. Each fiber is in a fixed position. Placed in front of each fiber is a one-quarter pitch Grade Refractive index (GRIN) lens 18. The purpose of the GRIN lens 18 is to collimate light for example from the first input fiber 10 and second input fiber 12, produce parallel light beams, and focus the parallel light beam into the first output fiber 14 and second output fiber 16.

The first input fiber 10 is placed opposite the second output fiber 16 while the second input fiber 12 is placed opposite the first output fiber 16. As is apparent from the drawing, the first input fiber 10 is located adjacent the first output fiber 14 while the second input fiber 12 is located adjacent the second output fiber 16. Disposed between the opposing fibers (first input fiber 10 and first output fiber 14 oppose second input fiber 12 and second output fiber 16) is a reflector assembly 20. The reflector assembly 20 comprises a first mirror 22, a second mirror 24 and a base 26. The first mirror 22 and second mirror 24 are affixed to base 26. In the preferred embodiment, both the first mirror 22 and the second mirror 24 have triangular shapes. When the reflector assembly 20 is in the light path, as will be described, the first mirror 22 is located between first input fiber 10 and second output fiber 16 while second mirror 24 is located between second input fiber 12 and first output fiber 14.

The first mirror 22 and second mirror 24 are preferably front surface mirror types that are coated with high reflectivity material such as silver or gold. The base 26 is preferably made of a non-magnetic material such as aluminum or stainless steel. There is a holding bar 28 located underneath base 26. The holding bar 28 is used to mount the reflector assembly 20 into a mounting hole 30 located on the top of a magnetic cylinder 32.

The magnetic cylinder 32 has a flat bottom surface 34 and a lumen 36 running its length. It is constructed using a permanent magnetic material. A non-magnetic bar 38 which is longer than the magnetic cylinder 32 runs through the lumen 36. The bar 38 holds the magnetic cylinder 32 in place and functions as its track. Disposed beneath the magnetic cylinder 32 is a non-magnetic platform 40 which is used as a guide. The combination of guide platform 40 and bar 38 keeps any movement of the magnetic cylinder's 32 linear. Additionally, there is a first non-magnetic stopper 42 and second non-magnetic stopper 43 disposed at either end of bar 38. The first stopper 42 and second stopper 43 control the precise position of the magnetic cylinder 32.

Located behind the first stopper 42 is a first soft iron 44. Located behind second stopper 43 is a second soft iron 45. both the first soft iron 44 and second soft iron 45 are wrapped with wire 46 such that a first coil 48 and a second coil 50 are formed. When the wire 46 is energized with electrical current, the first coil 48 and second coil 50 cause the first soft iron 44 and second soft iron 45 to become magnetized. When the electrical current goes through wire 46 in one direction, the current magnetizes the first soft iron 44 and second soft iron 45 such that the magnetic cylinder 32 moves in one direction or another.

The motion is such that the magnetic cylinder 32 rests against either first stopper 42 or second stopper 43. The polarity of the magnetic field created at the first soft iron 44 and second iron 45 depends upon the direction the wire 46 is wound around first soft iron 44 and second soft iron 45. The wire 46 is wound such that first coil 48 and second coil 50 are wound in separate directions (either clockwise or counterclockwise). This opposite winding causes opposite magnetic polarization at the first soft iron 44 and second soft iron 45.

The purpose of the first stopper 42 and second stopper 43 is to precisely position the magnetic cylinder 32. Because bar 38 is longer than magnetic cylinder 32, the magnetic cylinder 32, as discussed above, can move along bar 38. The magnetic cylinder 32 stops when it hits either the first stopper 42 or the second stopper 43, thereby performing the magnetic cylinder 32 positioning function.

Figure 8A:
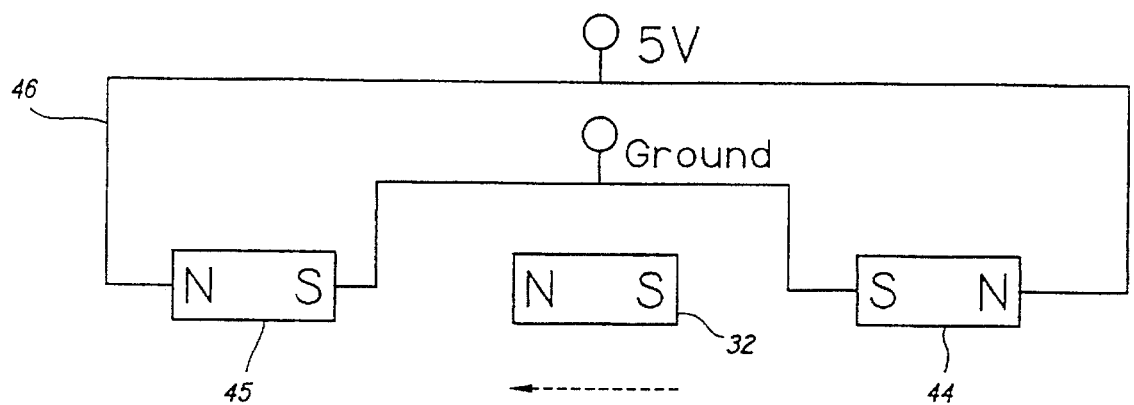
FIG. 8a is a schematic diagram of the electric circuit used to energize the two-by-two fiber optic switch of FIGS. 1 and 2.
Figure 8B:
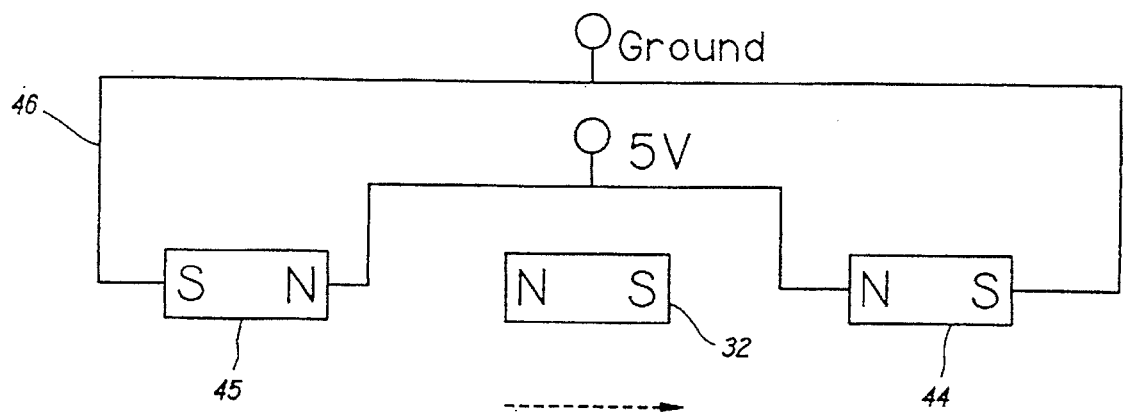
FIG. 8b is a schematic diagram of an electric circuit is used to energize the two-by-two fiber optic switch of FIGS. 1 and 2.

Thus, the magnetic field created by first soft iron 44 and second soft iron 45 causes magnetic cylinder 32 to move between first stopper 42 and second stopper 43 when the opposite electrical current polarity is applied. The effect of varying the current direction in copper wire 46 is schematically shown in FIGS. 8a and 8b, and will be discussed below.

Because the reflector assembly 20 is mounted on the magnetic cylinder 32, any movement by the magnetic cylinder 32 will cause the reflector assembly 20 to move, thereby changing the location of the first mirror 22 and second mirror 24. By moving the reflector assembly 20, the light signals emerging from the first input fiber 10 and second input fiber 12 change path.

Figure 3:
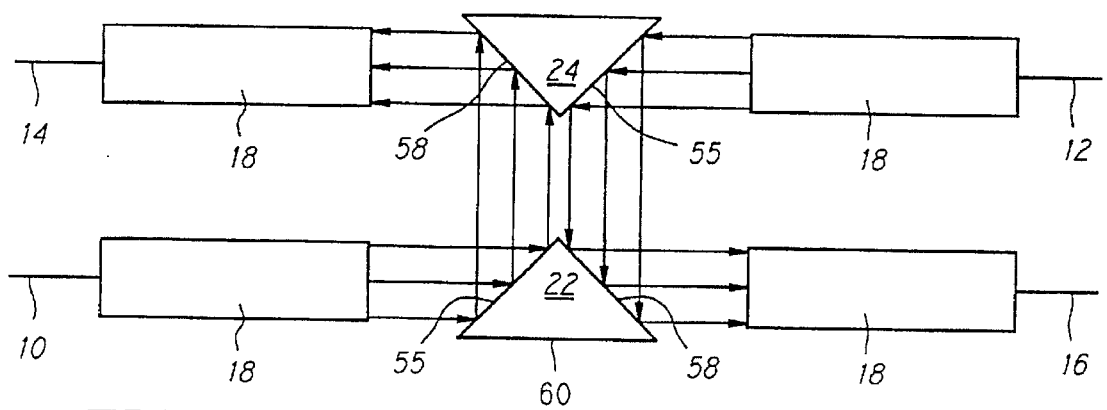
FIG. 3 is a top view of the reflector assembly and optical fibers of FIG. 1 showing optical light paths when a first embodiment of the invention is in a first position.

The paths of the light signals in the embodiment of the invention shown in FIG. 1 will now be discussed. FIG. 3 shows the light path of the invention when the reflector assembly is in its first position. To achieve the light path shown in FIG. 3, current may be applied to copper wire 46 such that magnetic cylinder 32 is attracted to first stopper 42. Because the reflector assembly 20 is mounted on the magnetic cylinder 32, it moves to its first position.

As discussed above, first mirror 22 and second mirror 24 are front surface mirrors. Both the first mirror 22 and the second mirror 24 have a first mirror surface 55 and a second mirror surface 58. First mirror surface 55 on the first mirror 22 is located in front of the first input fiber 10 when the reflector assembly is in its first position. First mirror surface 55 on the second mirror 24 is located in front of the second input fiber 12 when the reflector assembly 20 is in its first position.

Second mirror surface 58 is formed at a right angle (e.g., ninety degrees) to the first mirror surface 55. A third surface 60 can be connected to the first mirror surface 55 and the second mirror surface 58 such that both the first mirror 22 and second mirror 24 form an isosceles right-triangle. When the reflector assembly 20 is in its first position, second mirror surface 58 on the first mirror 22 is located in front of second output fiber 16. Second mirror surface 58 on the second mirror 24 is located in front of first output fiber 14 when the reflector assembly 20 is in its first position.

When the reflector assembly is in its first position, the first input fiber 10 transmits a parallel light signal through GRIN 18 that is incident on first mirror surface 55 of first mirror 22. Because of the angle in which first mirror surface 55 is disposed (preferably forty-five degrees with respect to the light signal), the parallel light signal bounces off of first mirror surface 55 and is transmitted to second mirror surface 58 of second mirror 24. The second mirror surface 58 of second mirror 24 is disposed such that the parallel light signal is then transmitted to the GRIN lens 18 on first output fiber 14, thereby completing a light path through the switch 5.

Additionally, when reflector assembly 20 is in its first position, the second input fiber 12 transmits a parallel light signal that is incident upon first mirror surface 55 of the second mirror 24. Because of the angle in which first mirror surface 55 is disposed, the parallel light signal bounces off first mirror surface 55 and is transmitted to second mirror surface 58 of first mirror 22. The second mirror surface 58 of first mirror 22 is disposed such that the parallel light signal is then transmitted to the GRIN lens 18 on second output fiber 16, thereby completing another light path through the switch 5.

Preferably the coating has a reflectivity of 97% or better. Because of the high reflectivity coating of first mirror 22 and second mirror 24, the insertion loss of the mirrors' 22, 24 reflection is very small (<0.1 dB from each reflection, based upon a normal reflectivity of ninety-nine percent).

The first mirror 22 and second mirror 24, as discussed above, are preferably formed as isosceles-right triangles. Because first mirror 22 and second mirror 24 are isosceles-right triangles, for proper operation the first input fiber 10 and first output fiber 14 will always be parallel to each other and the second input fiber 12 and second output fiber 14 will always be parallel to each other as well.

Additionally, in this configuration it is important that first input fiber 10 be collinear with second output fiber 16 and that second input fiber 12 be collinear with first output fiber 14. Arranging these fibers so that they are collinear makes it exceedingly simple to align the fibers 10, 12, 14, 16 and the mirrors 22, 24 properly. Even if the reflector assembly becomes slightly displaced from its first and second position the light path will remain aligned. Therefore, this embodiment of the invention is a very stable.

Figure 4:
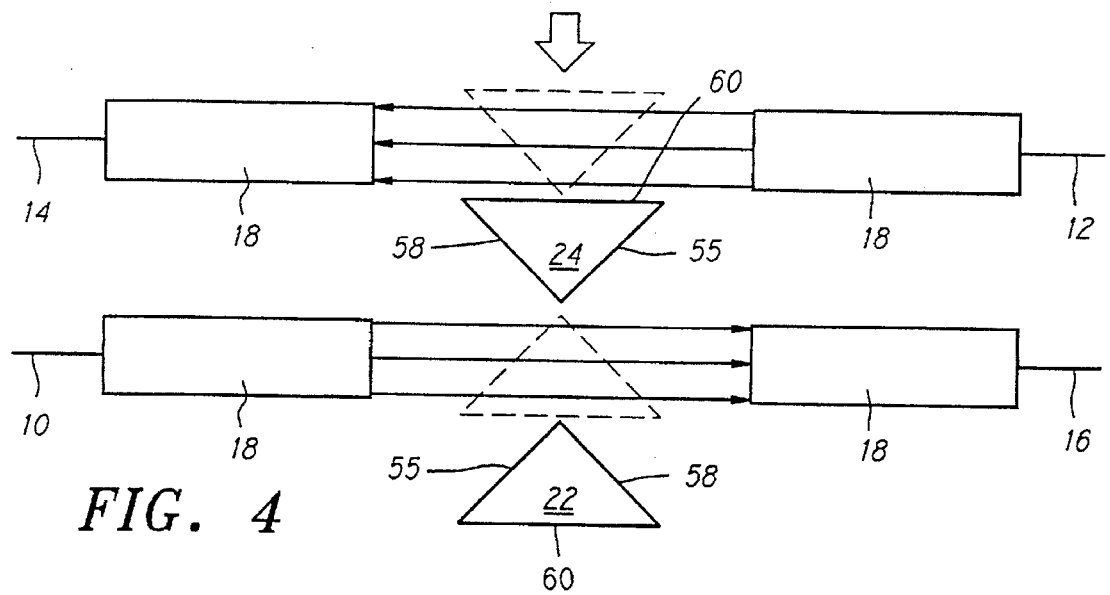
FIG. 4 is a top view of the reflector assembly and optical fibers of FIG. 1 showing alternate optical light paths.

FIG. 4, shows the available light paths of the switch when the reflector assembly 20 is moved to a second position. When the reflector assembly 20 is in its second position, the first mirror 22 and second mirror 24 move such that the light paths are no longer interrupted by the first mirror 22 or second mirror 24. The available light paths are therefore from the first input fiber 10 to the second output fiber 16 and from the second input fiber 12 to the first output fiber 14. As discussed above, the first input fiber 10 is collinear with the second input fiber 16 while the second input fiber 12 is collinear with the first output fiber 14. Therefore, when the first mirror 22 and second mirror 24 move away from the light paths, the first output fiber 14 and second output fiber 16 will receive the light signals transmitted from second input fiber 12 and first input fiber 10, respectively.

The first input fiber 10 and the first output fiber 14 are placed such that there is a distance between them. The same is true for the second input fiber 12 and first output fiber 14. The preferable distance selected is the minimum distance that will allow the first mirror 22 and the second mirror 24 to be situated between the light signals transmitted by the input fibers 10, 12 without causing any reflection when the reflector assembly is in the second position. The reflector assembly 20 therefore only needs to move a small distance to "switch" the light path, thereby sending the light signal to a different output.

As discussed above, the reflector assembly 20 may be mounted on the magnetic cylinder 32. Electric current applied to the copper wire 36 in one direction results the first magnetic coil 48 and second magnetic coil 50 creating a magnetic field of a certain polarity. This magnetic field will cause the magnetic cylinder 32 to move against either the first stopper 42 or the second stopper 43. When the magnetic cylinder 32 is moved to a first position, it carries the reflector assembly 20 such that the first mirror 22 and second mirror 24 are in the light path. This causes the light signal to be reflected. When the magnetic cylinder 32 is moved to a second position, it carries the reflector assembly 20 out of the light path, thereby resulting in no light signal reflection. Since the distance reflector assembly 20 moves is very short, the combination of the reflector assembly 20 and the moving magnetic cylinder 32 result in a two-by-two fiber optic switch with very fast switching speed.

Figure 2:
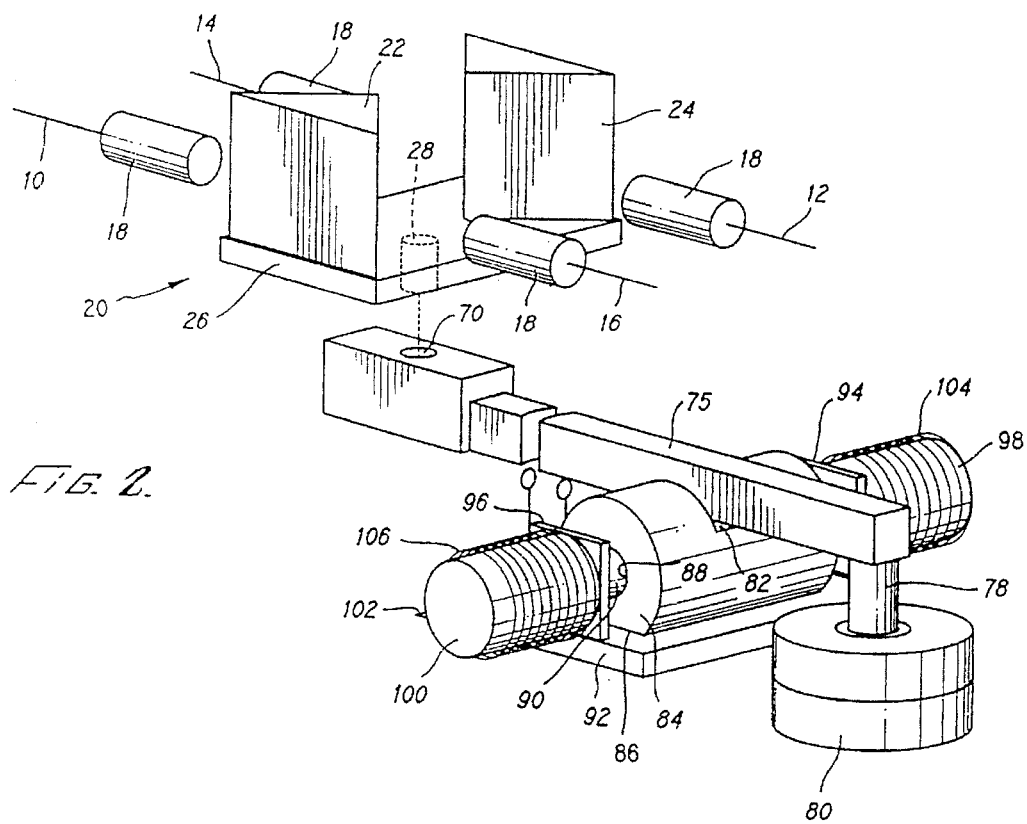
FIG. 2 is a perspective view of an alternative embodiment of a two-by-two fiber optic switch incorporating aspects of the invention.

A second embodiment of the invention is shown in FIG. 2. This embodiment can comprise the same reflector assembly 20 as the first embodiment, but uses an alternative means of moving it. As with the first embodiment, this embodiment uses the same system of first input fiber 10, second input fiber 12, first output fiber 14 and second output fiber 16. Additionally, GRIN lenses 18 are preferably placed in front of each fiber.

The plate 26 of the reflector assembly 20 is mounted on armature 75 by placing holding bar 28 into hole 70. The hole is located at a first end of the armature 75. The armature 75 is mounted on pivot bar 78 at its second end. The pivot bar 78 is placed such that it is rotatably mounted into ball bearings 80. Armature 75, therefore, acts as a lever that moves the reflector assembly 20.

Figure 15:
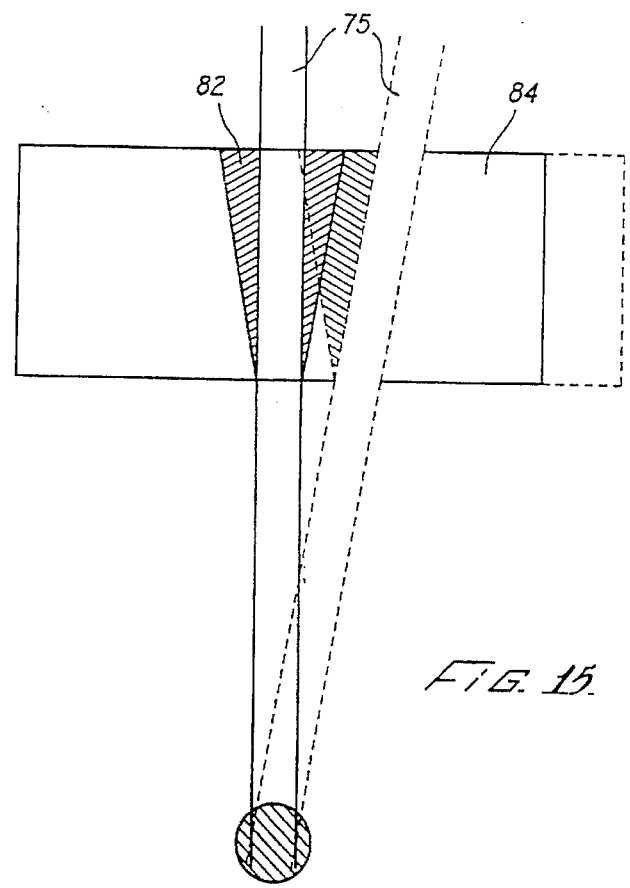
FIG. 15 is a top view of a pivot used to move an armature.
Figure 16:
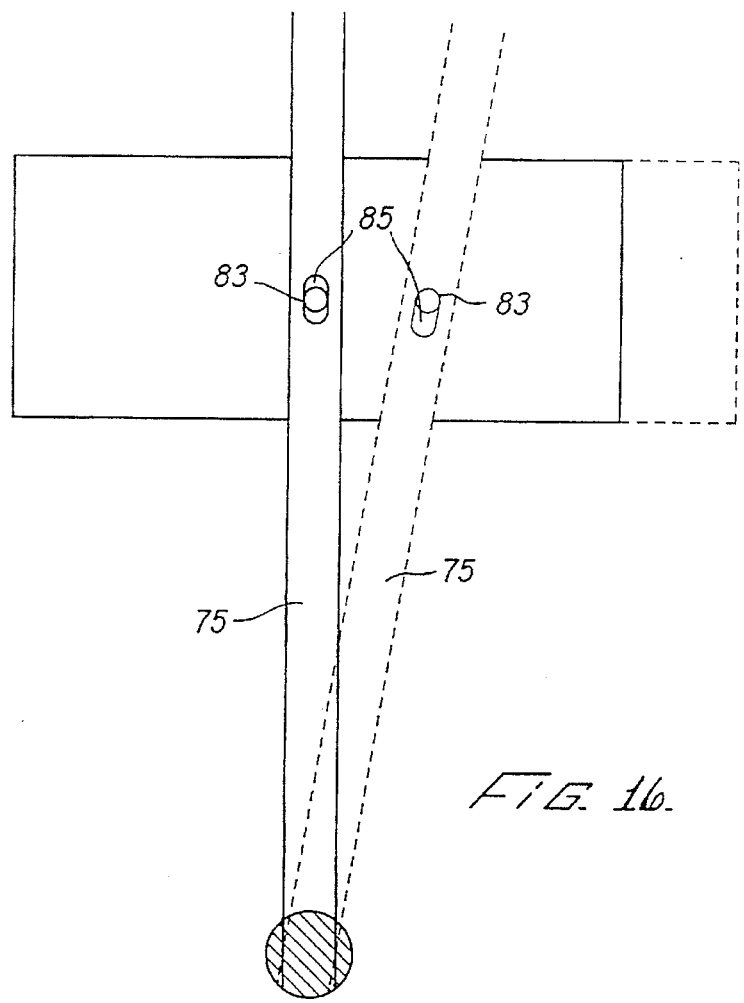
FIG. 16 is a top view of an alternative embodiment of a pivot used to move an armature.

The means of moving the armature 75, and therefore moving the reflector assembly 20 is similar to the means employed in the first embodiment. The armature 75 is mounted on the magnetic cylinder 84 such that any movement of the magnetic cylinder 84 will move the armature 75. Two examples of armature 75 mounting are shown in FIGS. 15 and 16. In FIG. 15, a slot 82 is formed on the magnetic cylinder 84. This slot 82 is formed in a V-shape such that any magnetic cylinder 84 movement can move the armature 75. FIG. 16 shows another pivot. In FIG. 16, a pivot pin 83 is formed on the magnetic cylinder 84. The armature 75 has a pivot opening 85 formed within it where the pivot pin 83 is inserted. This allows the magnetic cylinder 84 to move armature 75, thereby moving the reflector assembly 20.

The magnetic cylinder 84 has a flat bottom surface 86 and a lumen 88 running through its length. As in the first embodiment, It is constructed using a permanent magnetic material. A non-magnetic bar 90 which is longer than the magnetic cylinder 84 runs through the lumen 88. The bar 90 holds the magnetic cylinder 84 in place and functions as its track. Disposed beneath the magnetic cylinder 84 is a non-magnetic platform 92 which is used as a guide. The combination of guide platform 92 and bar 90 keeps any magnetic cylinder 84 movement linear. Also as in the first embodiment, there is a first non-magnetic stopper 94 and second non-magnetic stopper 96 disposed at either end of bar 90. The first stopper 94 and second stopper 96 control the precise position of the magnetic cylinder 84.

As in the first embodiment, there is a first soft iron 98 located behind the first stopper 94. Located behind second stopper 96 is a second soft iron 100. Both the first soft iron 98 and second soft iron 100 are wrapped with wire 102 such that a first coil 104 and a second coil 106 are formed. When the wire 102 is energized with electrical current, the first coil 104 and second coil 106 cause the first soft iron 98 and second soft iron 100 to become magnetized. When the electrical current goes through wire 102 in one direction, the current magnetizes the first soft iron 98 and second soft iron 100 such that the magnetic cylinder 84 moves in one direction or another.

The motion is such that the magnetic cylinder 84 ends up resting against either first stopper 94 or second stopper 96. The polarity of the magnetic field created at the first soft iron 98 and second soft iron 100 depends upon the direction the wire 102 is wound around first soft iron 98 and second soft iron 100. The wire 102 is wound such that first coil 104 and second coil 106 are wound in opposite directions (either clockwise or counterclockwise). This opposite winding causes opposite magnetic polarization of the first soft iron 98 and second soft iron 100.

As mentioned, the purpose of the first stopper 94 and second stopper 96 is to precisely position the magnetic cylinder 84. Because bar 90 is longer than magnetic cylinder 84, the magnetic cylinder 84, as discussed above, can move along bar 90. The magnetic cylinder 84 stops when it hits either the first stopper 94 or the second stopper 96, thereby performing the magnetic cylinder 84 positioning function. Alternatively the pivot opening 85 or the slot 82 can be used as the means for positioning.

Thus, the magnetic field created by first soft iron 98 and second soft iron 100 causes magnetic cylinder 84 to move between first stopper 94 and second stopper 96 when the opposite electrical current polarity is applied. The effect of varying the current direction in copper wire 102 is shown in FIGS. 8.1 and 8.2 and will be discussed below.

When the magnetic cylinder 84 moves, it pushes the armature 75 in a circular arc. The movement of the armature 75 is in the same direction as the magnetic cylinder 84. Since armature 75 acts as a lever, it moves in a circular arc with a center at ball bearings 80. Because the armature 75 moves in a circular arc, the reflector assembly 20 also moves in a circular arc.

Figure 5:
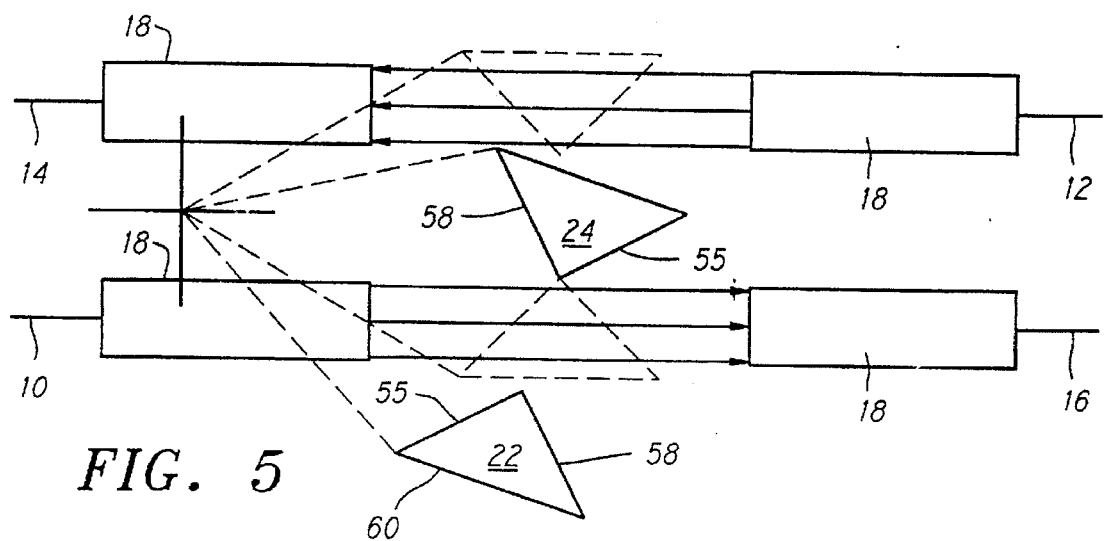
FIG. 5 is a top view of the reflector assembly and optical fibers of FIG. 2 showing optical light paths.

FIG. 5 shows the light path change when using the embodiment of FIG. 2. As discussed, the reflector assembly 20 has a first mirror 22 and a second mirror 24 mounted on a base 26. Both the first mirror 22 and second mirror 24 are shaped as isosceles right-triangles and have a first mirror surface 55, a second mirror surface 58 and a third surface 60 (if desired) that connects between the first mirror surface 55 and second mirror surface 58. When the armature 75 swings the reflector assembly 20 to a first position, the first mirror 22 and second mirror 24 are placed such that they are in the light path created by the first input fiber 10, second input fiber 12, first output fiber 14 and second output fiber 16.

When the reflector assembly is in the first position, the light path of a light signal emerging from the first input fiber 10 is as follows. The light signal is transmitted by the first input fiber 10 such that it is reflected off first mirror surface 55 of first mirror 22. The reflected light signal then bounces off of the second mirror surface 58 of second mirror 24 such that it is transmitted to first output fiber 14. The light path of a light signal transmitted by second output fiber 12 is similar. The light signal is transmitted by the second input fiber 12 such that it is reflected off first mirror surface 55 of second mirror 24. The reflected light signal then bounces off of the second mirror surface 58 of first mirror 22 such that it is transmitted to second output fiber 16.

When the magnetic cylinder 84 is moved to its second position, it moves the armature 75 such that reflector assembly 20 moves to its second position. In the reflector assembly's 20 second position, the first mirror 22 and second mirror 24 move such that they are no longer in the light path, thereby creating a situation where no reflection takes place. Therefore, the light signals transmitted by first input fiber 10 and second input fiber 12 are transmitted directly to second output fiber 16 and first output fiber 14, respectively.

As in the embodiment of FIG. 1, the embodiment of FIG. 2 is constructed so that the switching between the first position (where there is a reflected light path) and the second position (where there is no reflection in the light path) is very fast. Fast switching speeds are accomplished, as discussed above, by keeping the distance between adjacent fibers (first input fiber 10 and first output fiber 14 are adjacent, as are second input fiber 12 and second output fiber 16) as small as possible. This distance is selected such that one of either the first mirror 22 or second mirror 24 can fit between the light path such that the light path is transmitted without obstruction. Since the mirrors only need to be about as wide as the light beam to be able to reflect it, the distance can be very small. By making this distance small, the reflector assembly 20 need only be moved a short distance by the magnetic cylinder 20. This allows for very fast switching speeds.

Also as in the embodiment of FIG. 1, the embodiment of FIG. 2 is constructed so that the switch has very high stability. High stability is obtained by keeping first input fiber 10 and second output fiber 16 as well as the second input fiber 12 and the first output fiber 14 collinear. This will allow the light signals that are transmitted from the first input fiber 10 and second input fiber 12 to be aligned with the first output fiber 14 and second output fiber 16. This is true whether the reflector assembly 20 is in its first position or second position.

When the reflector assembly 20 is in the first position, thereby causing the reflected light path described above, the collinear input and output fibers, in conjunction with the isosceles right-triangle shaped first mirror 22 and second mirror 24 result in a switch with inherently high stability. This results in the light signal of the first input fiber 10 and second input fiber 12 striking the first mirror surface 55 at a forty-five degree angle. Because of this, the light signal reflects off the first mirror surface 55 at a ninety degree angle from its original path. The reflected light signal then strikes the second mirror surface 58 at forty-five degree angle as well. The light signal then reflects off the second mirror surface 58 at a ninety degree angle, thereby transmitting the light signal to the output fiber 14, 16. Thus, the right-triangular shape of the first mirror 22 and second mirror 24 result in the light signals being accurately reflected to the output fibers 14, 16.

Front coating the first mirror 22 and the second mirror 24 allows for high stability, even when the reflector assembly 20 becomes slightly misaligned. As discussed above, the first mirror 22 and second mirror 24 are coated on the first surface 55 and second surface 58. Coating the surfaces allows the light signals to reflect directly off the surface of the mirror, thereby maintaining the angles of reflection discussed above. If the mirrors are not coated on the surface, the light signal will have to pass through glass (or any other mirror substrate chosen) before reaching the mirror surface. In the situation when the light signal passes through the glass, refraction will occur that will cause the angles of reflection to deviate from those discussed above, thereby increasing losses and decreasing stability when the reflector assembly 20 becomes slightly misaligned.

Figure 6:
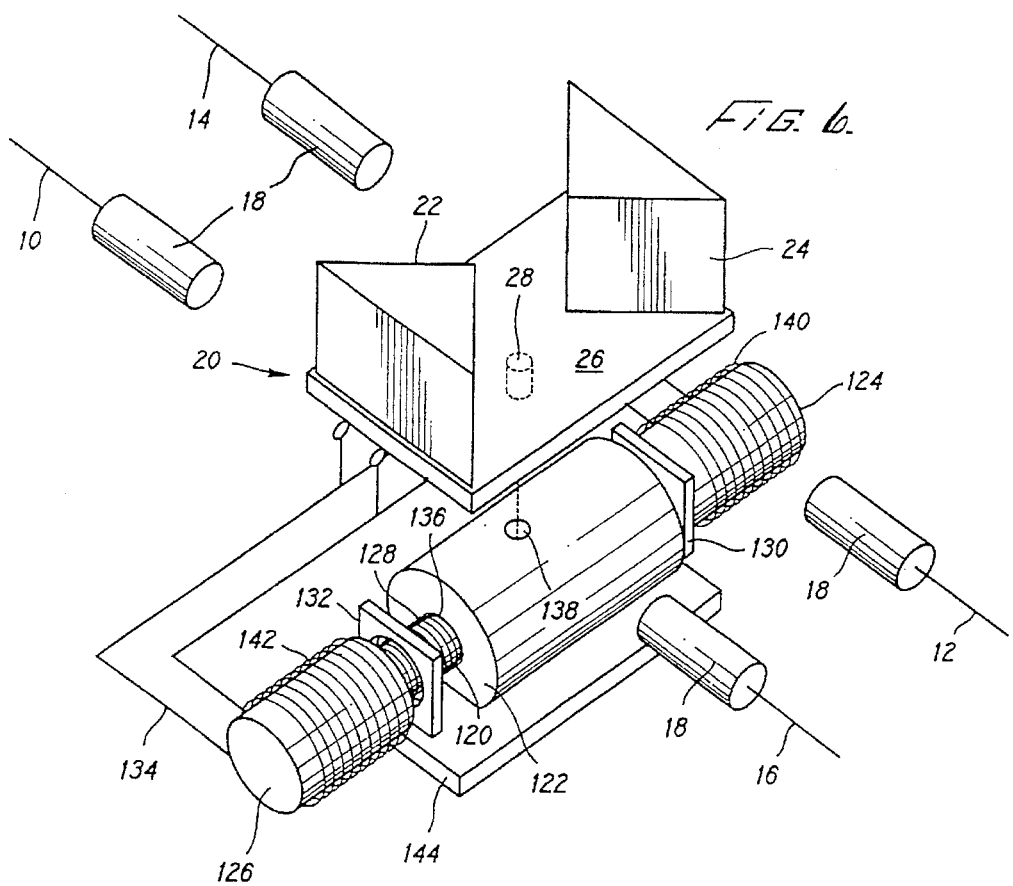
FIG. 6 is a view of an embodiment of a bypass switch made in accordance with aspects of the invention.

FIG. 6 shows a alternative embodiment of the invention. The embodiment of FIG. 6 is similar to the embodiment of FIG. 1. The main difference between the embodiment of FIG. 1 and FIG. 6 is the addition of a biasing means. In this case a spring 120 is placed between magnetic cylinder 122 and second soft iron 126 such that it surrounds bar 128 to create a biasing force. There is no spring, however, between magnetic cylinder 122 and the first soft iron 124. The spring 120 is placed around bar 128 such that it passes through the second stopper 132.

The operation of this embodiment is similar to that of FIG. 1. As in the FIG. 1 embodiment, the magnetic cylinder 122 has a lumen 136 disposed therethrough. The bar 128 runs through the lumen 136 and functions, in conjunction with guide plate 144, as a guide for magnetic cylinder 122. The reflector assembly 20 is mounted on the magnetic cylinder 122 via holding bar 28. Holding bar is inserted into mounting hole 138. When no current is applied to wire 134, the spring 120 biases the magnetic cylinder 122 such that it rests against first stopper 130. No electric current is necessary to place or keep the reflector assembly 20 in the first position.

As above, when the reflector assembly 20 is in the first position, the first mirror 22 and second mirror 24 will be in the light path, thereby causing the light signal from first input fiber 10 to be transmitted to first output fiber 14 and the light signal from second input fiber 12 to be transmitted to second output fiber 16.

When copper wire 134 has current running through it, the first soft irons 124 and second soft iron 126 will become magnetized by the first copper coil 140 and second copper coil 142, respectively. The magnetic field created by the first soft iron 124 and second soft iron 126 is such that it will pull the magnetic cylinder 122 toward the second soft iron 126, thereby overcoming the force created by spring 120. The magnetic cylinder 122 will eventually rest upon the second stopper 130. Because the reflector assembly 20 is mounted on the magnetic cylinder 122, it will move to its second position. When the reflector assembly 20 is in the second position, the light path will be unobstructed by the first mirror 22 and second mirror 24. Therefore, the light signals of first input fiber 10 and second input fiber 12 will be transmitted directly to second output fiber 16 and first output fiber 14, respectively, without reflection.

When the electric current is removed from wire 134, the magnetic force created by first soft iron 124 and second soft iron 126 will disappear, thereby allowing the spring 120 to push the magnetic cylinder 122 back to the first position. In this embodiment, the movement of the mirrors is linear. Therefore, the light paths are illustrated by FIG. 3 and FIG. 4.

Figure 7:
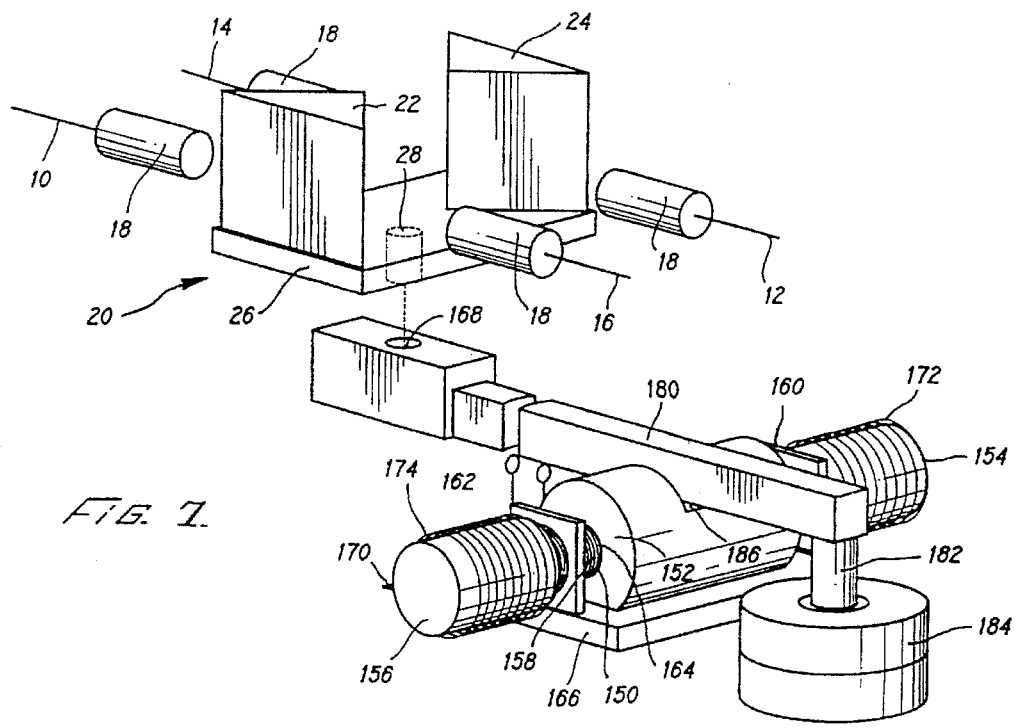
FIG. 7 is a view of an embodiment of a bypass switch made in accordance with aspects of the invention.

FIG. 7 shows another alternative embodiment of the invention. The embodiment of FIG. 7 is similar to the embodiment of FIG. 2. The main difference between the embodiment of FIG. 2 and FIG. 7 is the addition of a biasing means. In this case a spring 150 is placed between magnetic cylinder 152 and second soft iron 156 such that it surrounds bar 158 and generates a biasing force. There is no spring, however, between magnetic cylinder 152 and the first soft iron 154. The spring 150 is placed around bar 158 such that it passes through the second stopper 162.

The operation of this embodiment is similar to that of FIG. 2. As in the FIG. 2 embodiment, the magnetic cylinder 152 has a lumen 164 disposed therethrough. The bar 158 runs through the lumen 164 and functions, in conjunction with guide plate 166, as a guide for magnetic cylinder 152. The reflector assembly 20 is mounted on armature 180 via holding bar 28. Holding bar 28 is placed in hole 168 located at a first end of the armature 180.

In this embodiment of the invention, a pivot such as slot 186 is placed on magnetic cylinder 152. The armature 180 is placed on the pivot. Either of the pivots shown in FIGS. 15 and 16 will perform the necessary pivoting function. At the second end of armature 180 is a pivot bar 182. The pivot bar 182 is placed such that it is rotatably mounted into ball bearings 184. Therefore, any movement of the magnetic cylinder 152 will cause the armature 180 to rotate about the ball bearings 184. The reflector assembly 20, which is mounted on the armature 180, will in turn be moved because the armature 180 will be acting as a lever.

When no power is applied to wire 170, the spring 150 biases the magnetic cylinder 152 such that it rests against first stopper 160. When the magnetic cylinder 152 is biased against first stopper 160, the armature 180 is rotated, which moves reflector assembly 20 to its first position. Therefore, no electric current is necessary to keep the reflector assembly 20 in the first position.

As above, when the reflector assembly 20 is in the first position, the first mirror 22 and second mirror 24 will be in the light path, thereby causing the light signal from first input fiber 10 to be transmitted to first output fiber 14 and the light signal from second input fiber 12 to be transmitted to second output fiber 16.

When wire 170 has current running through it, the first soft iron 154 and second soft iron 156 is such that it will become magnetized by the first copper coil 172 and second copper coil 174, respectively. The magnetic field created by the first soft iron 154 and second soft iron 156 will pull the magnetic cylinder 152 toward the second soft iron 156, thereby overcoming the bias created by spring 150. The magnetic cylinder 152 will eventually rest against second stopper 162. This change in position occurs very quickly.

Because the reflector assembly 20 is mounted on armature 180, when magnetic cylinder 152 rests against second stopper 162, the reflector assembly 120 will have moved to its second position. When the reflector assembly 20 is in the second position, the light path will be unobstructed by the first mirror 22 and second mirror 24. Therefore, the light signals of first input fiber 10 and second input fiber 12 will be transmitted directly to second output fiber 16 and first output fiber 14, respectively, without reflection.

When the electric current is removed from wire 170, the magnetic force created by first soft iron 154 and second soft iron 156 will disappear, thereby allowing the spring 150 to push the magnetic cylinder 152 back to the first position. In this embodiment, the movement of the mirrors is a circular arc. Therefore, the light paths are illustrated by FIG. 5.

FIG. 8.1 shows the relationship between the first soft iron 44, second soft iron 45 and magnetic cylinder 32 when current is applied in wire 46 in one direction. The embodiment of FIG. 1 is used as an example. However, the relationships discussed apply for the other embodiments as well. The first soft iron 44 and second soft iron 45 are magnetized by energizing the first copper coil 48 and second copper coil 50. In soft iron 44, a polarity opposite that of the magnetic cylinder 32 is created. In second soft iron 45, a polarity the same as magnetic cylinder 32 is created. The polarities produced with the current in the direction of FIG. 8.1 are such that the magnetic cylinder 32 is pulled by second soft iron 45 (second soft iron 45 having a southern polarity facing magnetic cylinder's 32 northern polarity, thereby causing attraction) and pushed by first soft iron 44 (first soft iron 44 having a southern polarity facing magnetic cylinder's 20 southern polarity, thereby causing repulsion). This pushing and pulling moves the magnetic cylinder towards the second soft iron 45. These pushing and pulling forces are such that the magnetic cylinder 32 moves very fast.

FIG. 8.2 shows the relationship between the first soft iron 44, second soft iron 45 and magnetic cylinder 32 when current is applied in wire 46 in the opposite direction as in FIG. 8.1. The embodiment of FIG. 1 is used as an example. However, the relationships discussed apply for the other embodiments as well. The first soft iron 44 and second soft iron 45 are magnetized by energizing the first copper coil 48 and second copper coil 50. In first soft iron 44, the polarity created is the same as that of the magnetic cylinder 32. In second soft iron 45, a polarity the opposite as magnetic cylinder 32 is created. The polarities produced with the current in the direction of FIG. 8.2 are such that the magnetic cylinder 32 is pushed by second soft iron 45 (second soft iron 45 having a northern polarity facing magnetic cylinder's 32 northern polarity, thereby causing repulsion) and pulled by first soft iron 44 (first soft iron 44 having a northern polarity facing magnetic cylinder's 20 southern polarity, thereby causing attraction). This pushing and pulling moves the magnetic cylinder towards first soft iron 44.

Figure 9:
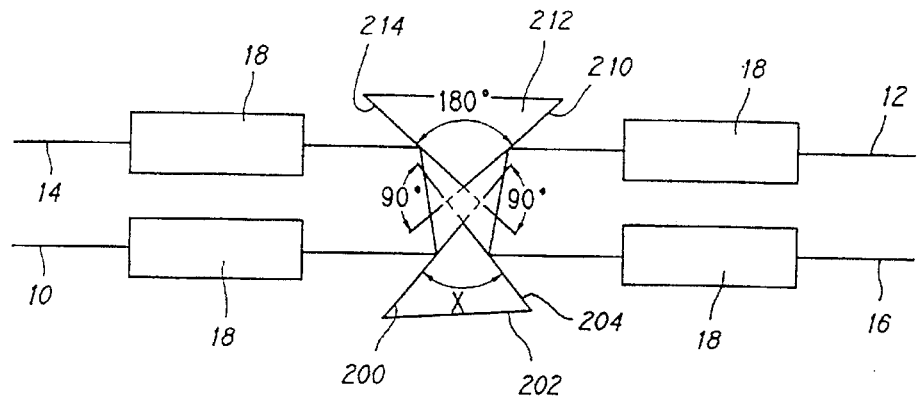
FIG. 9 is a top view of a reflector assembly and optical fibers made in accordance with aspects of the invention.

FIG. 9 shows an embodiment of the invention similar to those described above. As discussed above, the reflector assembly 20 used is the same for each of the described mechanisms. The first mirror 22 and second mirror 25 of the reflector assembly 20, however, can be replaced with mirrors having virtually infinite combinations of shapes. For example, the first mirror 22 and second mirror 24 can be replaced by the mirrors having the shape shown in FIG. 9. As discussed above, the first mirror 22 and second mirror 24 were shaped as isosceles right-triangles. Thus, first mirror surface 55 and second mirror surface were disposed at ninety degree angles.

It is possible, however, to use triangular shaped mirrors that do not dispose the first mirror surface 55 and second mirror surface 58 at ninety degree angles. The means used to determine the angle that first mirror surface 55 and second mirror surface 58 can be disposed at will now be described. The angle between first mirror surface 200 of the first mirror 202 and second mirror surface 204 of the first mirror 202 is set at X degrees. The angle between the first mirror surface 210 of second mirror 212 and second mirror surface 214 of second mirror 212 is set at one hundred-eighty minus X degrees. Therefore, as shown in FIG. 9, the angle between the second mirror surface 204 of the first mirror 202 is ninety degrees. The angle between the first mirror surface 210 of the second mirror 212 and the second mirror surface 204 of the first mirror 202 is also ninety degrees. This relationship is always true.

With the first mirror 202 and second mirror 212 being constructed according to this relationship, first input fiber 10, second input fiber 12, first output fiber 14 and second output fiber 16 are arranged in the same fashion as the other embodiments discussed. The light paths are also the same as those discussed above. As discussed above, all the mirrors use front surface mirrors with high reflectivity. The coated sides of the mirrors are used for reflection.

Figure 10:
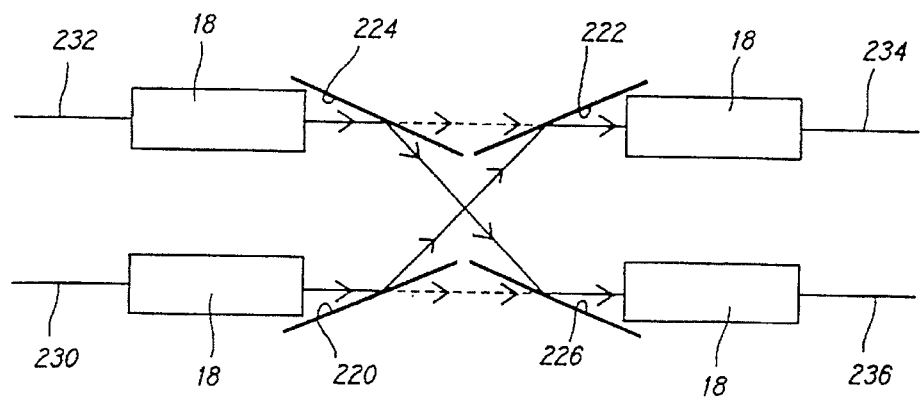
FIG. 10 is a top view of a reflector assembly and optical fiber arranged in accordance with aspects of the invention.

FIG. 10 shows an alternative embodiment of the invention. In the embodiment of FIG. 10, instead of using two triangular shaped mirrors, four separate mirrors, first mirror surface 220, second mirror surface 222, third mirror surface 224 and fourth mirror surface 226, are used. Additionally, in this embodiment, the optical fibers are relocated so that both input fibers are on the same side of the switch. First input fiber 230 and second input fiber 232 are placed such that they are collinear with second output fiber 236 and first output fiber 234, respectfully. As in the other embodiments, each mirror 220, 222, 224, 226 are front surface mirrors.

First mirror surface 220 and second mirror surface 222 are arranged such that the light signal transmitted by first input fiber 230 reflects off first mirror surface 220 to second mirror surface 222. Second mirror surface 222 then reflects the light signal to first output fiber 234. When first mirror surface 220 and second mirror surface 222 are removed from the light signal from first input fiber 230, the light signal is not reflected, and therefore travels directly to second output fiber 236. Third mirror surface 224 and fourth mirror surface 226 are arranged such that the light signal transmitted by second input fiber 232 reflects off third mirror surface 224, thereby travelling to fourth mirror surface 226. Fourth mirror surface 226 then reflects the light signal to second output fiber 236. When third mirror surface 224 and fourth mirror surface 226 are removed from the light path, the light signal is not reflected, and therefore travels directly to first output fiber 234. Note, however, that when first mirror surface 220, second mirror surface 222, third mirror surface 224 and fourth mirror surface 236 are in the light path, the light signals reflecting off first mirror surface 220 and third mirror surface 224 can intersect. This intersection could cause interference.

Figure 11:
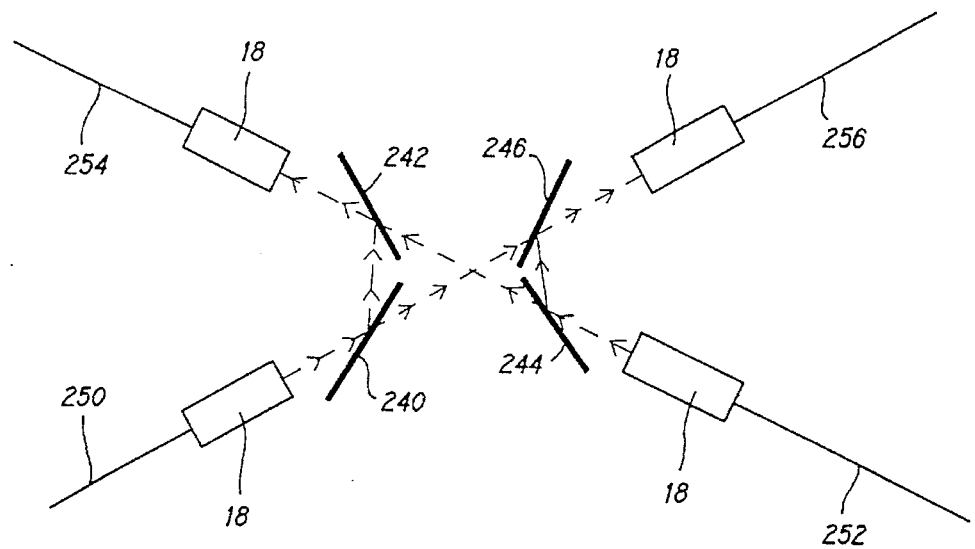
FIG. 11 is a top view of a reflector assembly and optical fiber arranged in accordance with aspects of the invention.

FIG. 11 shows yet another alternative embodiment of the invention. The first mirror 22 and second mirror 24 are replaced by first mirror 240, second mirror 242, third mirror 244 and fourth mirror 246. Additionally, the location of the optical fibers have been relocated. First input fiber 250 and first output fiber 254, while remaining adjacent, are no longer parallel to one another. The same is true for second input fiber 252 and second output fiber 254. The optical fibers are arranged, however, such that first input fiber 250 and second output fiber 256 are collinear. Second input fiber 252 is collinear with first output fiber 254. Much like prior embodiments, when the first mirror 240, second mirror 242, third mirror 244 and fourth mirror 246 are placed in the light path, the light signals go through two reflections to travel to the targeted output. For example, a light signal transmitted by first input fiber 250 will bounce off first mirror 240 and second mirror 242 to reach first output fiber 254. The first input fiber 250, first mirror 240, second mirror 242 and first output fiber 254 are disposed at angles relative to each other such that the light signal sent by first input fiber 250 reaches first output fiber 254 with high stability.

A light signal transmitted by second input fiber travels a similar path as that described for first input fiber 250. A light signal transmitted from second input fiber 252 will bounce off third mirror 244 and fourth mirror 246 to reach second output fiber 256. The second input fiber 252, third mirror 244, fourth mirror 246 and second output fiber 256 are disposed at angles relative to each other such that the light signal sent by second input fiber 252 reaches second output fiber 256 with high stability. When the mirrors 240, 242, 244, 246 are removed from the light path, the light signal goes from first input fiber 250 to second output fiber 256 and from second input fiber 252 to first output fiber 254. Note, however, that when first mirror 240, second mirror 242, third mirror 244 and fourth mirror 246 are removed from the light path, the light paths intersect. This could cause optical interference.

Figure 12:
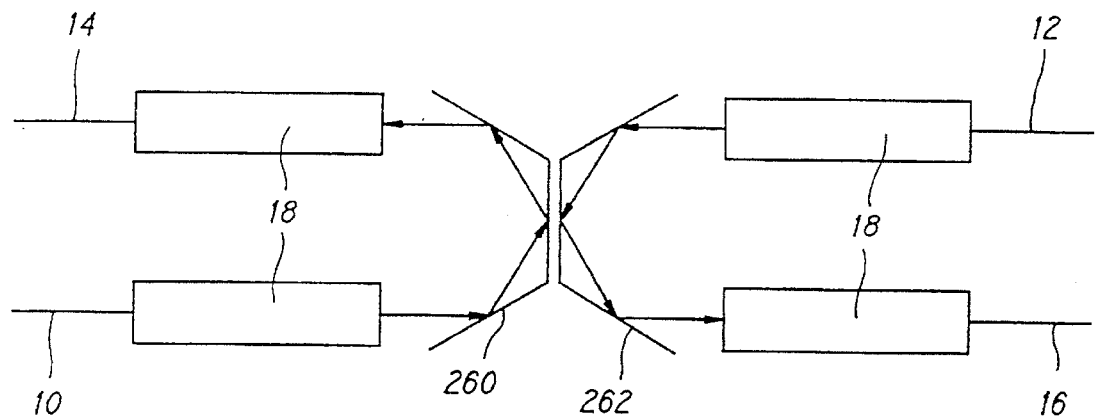
FIG. 12 is a top view of a reflector assembly and optical fiber arranged in accordance with aspects of the invention.

FIG. 12 shows yet another embodiment of the invention. This embodiment replaces the first mirror 22 and second mirror 24 with a first three-faced mirror 260 and a second three-faced mirror 262. The first input fiber 10, second input fiber 12, first output fiber 14 and second output fiber 16 are disposed in the same manner as the embodiments of FIGS. 1–2, 6–7 and 9. When the first three-faced mirror 260 and second three-faced mirror 262 are placed in the light path, the light signals transmitted by first input fiber 10 and second input fiber 12 go through a series of three reflections off first three-faced mirror 260 and second three-faced mirror 262, respectively. This is unlike the prior embodiments, where only two reflections were required to transmit the light signal for first input fiber 10 and second input fiber 12 to first output fiber 14 and second output respectively.

Figure 13:
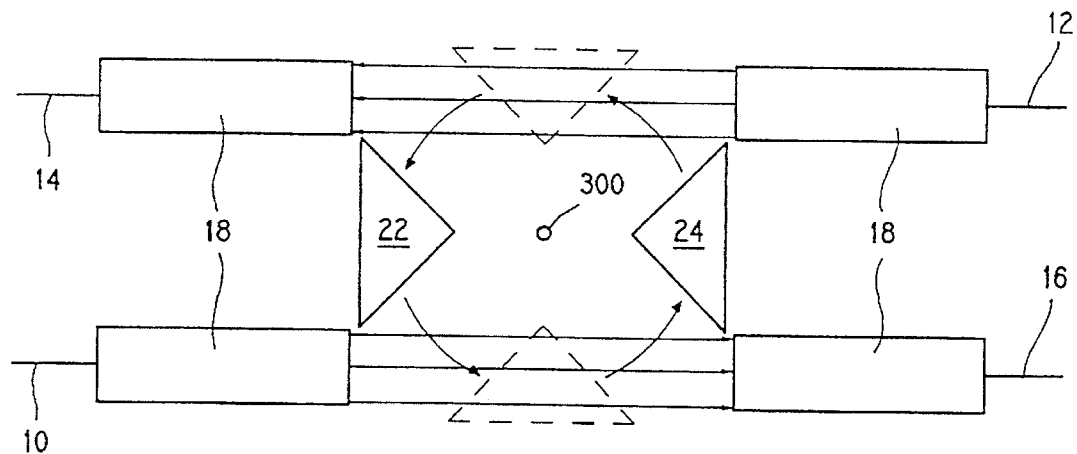
FIG. 13 is a top view of an alternative embodiment where the reflector assembly rotates on a motor.
Figure 14:
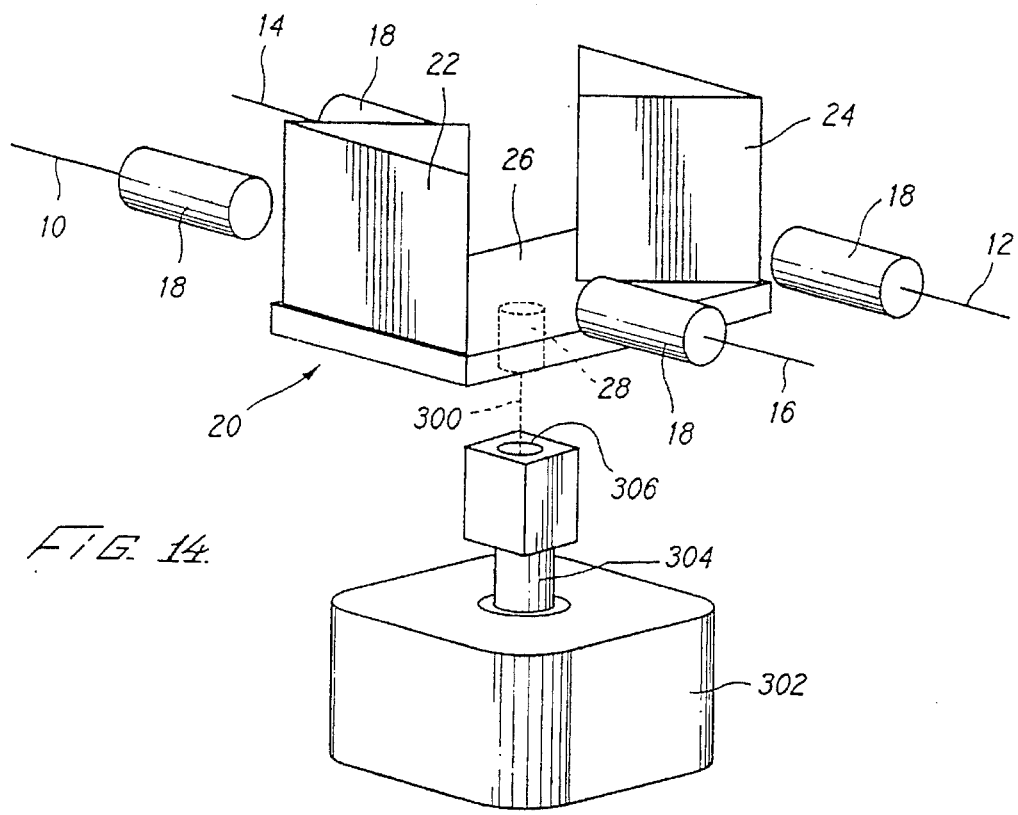
FIG. 14 is a two-by-two fiber optic switch made in accordance with the aspects of the invention.

FIG. 13 and FIG. 14 Show still yet another embodiment of the invention. In this embodiment, the reflector assembly 20 is mounted on a motor 302. The reflector assembly 20 rotates about the motor 302 axis 300 through shaft 304 such that it is either in the light path or it is not. The reflector assembly 20 has holding bar 28 that is inserted into mounting hole 306. This effectuates mounting between reflector assembly 20 and motor 302. The motor 302 need only rotate the reflector assembly 20 in one direction due to the symmetric geometries of the device. First input fiber 10 and first output fiber 14 must be placed far enough apart such that the first mirror 22 and second mirror 24 can fit between the unreflected light paths. Second output fiber 16 remains collinear with first input fiber 10 and second input fiber 12 remains collinear with first output fiber 14. The unreflected light path is shown in FIG. 13. The reflected light path is the same as that shown in FIG. 3.

Figure 17:
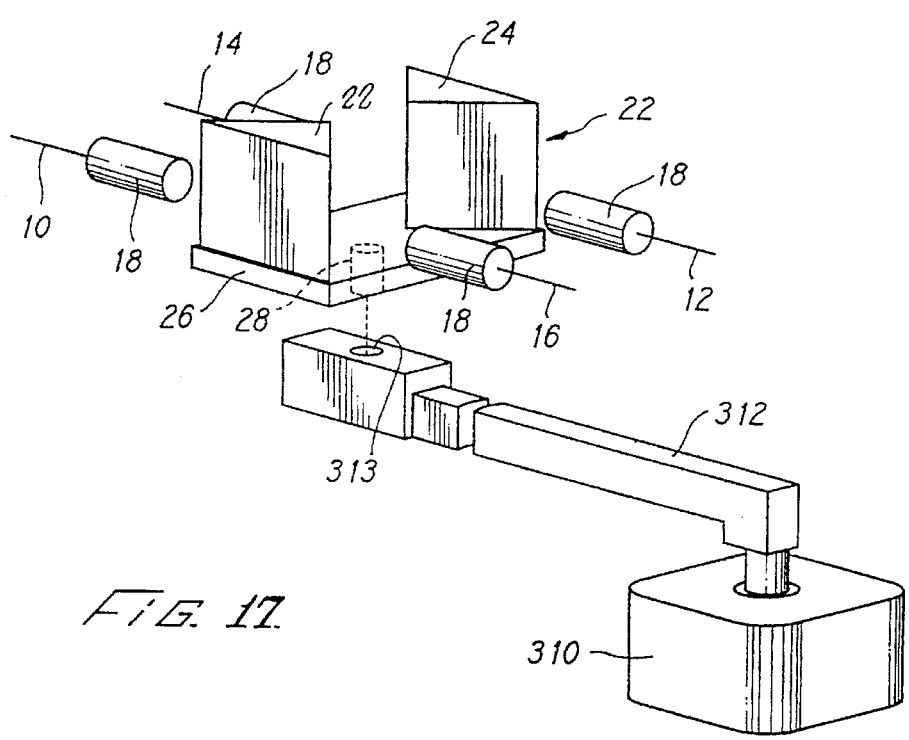
FIG. 17 is a perspective view of a two-by-two fiber optic switch made in accordance with the aspects of the invention.

FIG. 17 shows another embodiment utilizing a motor 310. Motor 310 is used to move armature 312 to the first and second position. Armature 312 has a mounting hole 313 that has holding bar 28 of the reflector assembly 22 inserted therein. The light paths in this embodiment will be the same as in FIG. 5.

An embodiment of the invention utilizing a motor 302 will have switching speeds that are faster than those of the moving magnetic cylinder 32. However, a motor 302 that would provide the torque and speed necessary in this application would require between twelve and twenty-four volts to operate. The industry, however, prefers the use of five volt devices, which the magnetic cylinder 32 embodiments can operate on.

Figure 18:
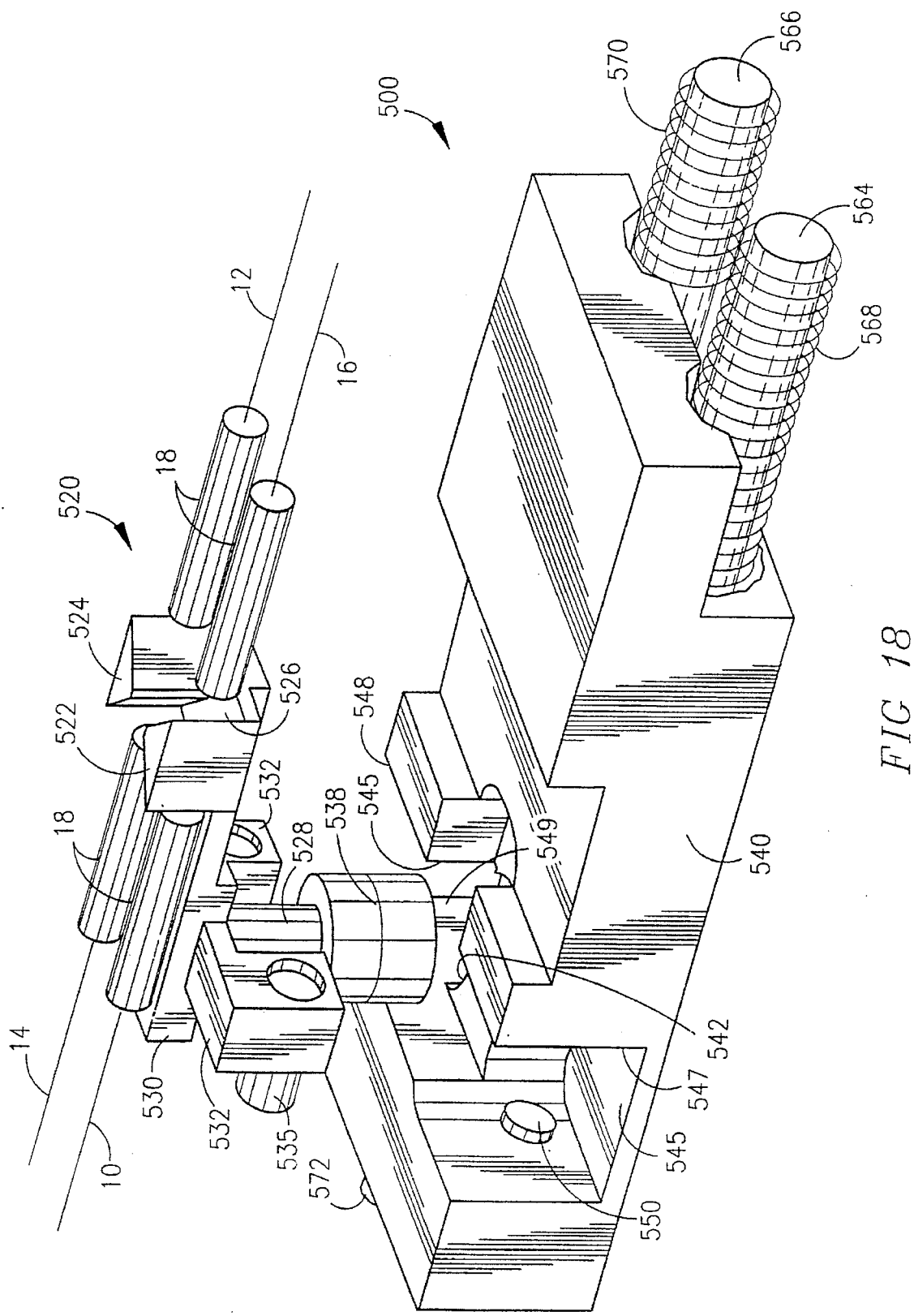
FIG. 18 is a perspective view of a two-by-two fiber optic switch made in accordance with the aspects of the invention.
Figure 19:
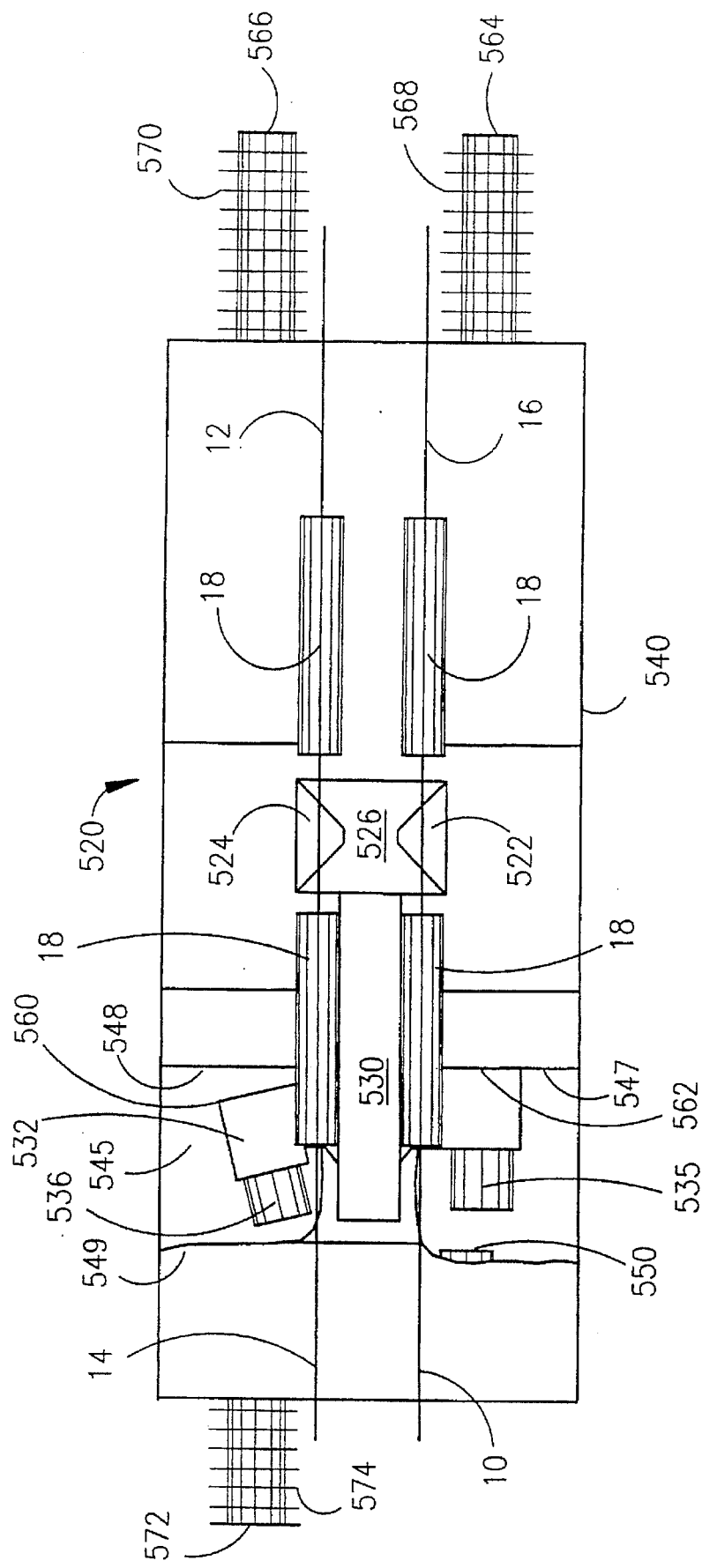
FIG. 19 shows a top view of the two-by-two fiber optic switch shown in FIG. 18.

FIGS. 18–23 show yet another embodiment of the present invention. FIG. 18 shows a perspective view and FIG. 19 shows a top view. In the embodiments of FIGS. 18 and 19, the switch 500 comprises first input fiber 10, a second input fiber 12, a first output fiber 14 and a second output fiber 16 with GRIN lenses 18. The switch 500 has a reflector assembly 520 comprising a first mirror 522, a second mirror 524 and a base 526. The first mirror 522 and second mirror 524 are affixed to reflector base 526. In the preferred embodiment, both the first mirror 522 and the second mirror 524 have triangular shapes. When the reflector assembly 520 is in the light path, as will be described, the first mirror 522 is located between first input fiber 10 and second output fiber 16 while second mirror 524 is located between second input fiber 12 and first output fiber 14. Reflector base 526 has an axial portion 530 that is connected to a support 528 and rotation stop 532. Support 528 is rotatably mounted in bearing assembly 538.

As seen in FIGS. 18 and 19, rotation stop 532 holds magnets 535 and 536 in the reflector assembly 520. Magnets 535 and 536 are installed such that a portion of them exist within the rotation stop 532 and a portion exist external to rotation stop 532. The shape of rotation stop 532 is best seen with reference to FIG. 19. Rotation stop 532 has two preferably integral portions 560 and 562, with one part deflected from the axis of the other portion. As will be discussed in more detail below, the integral portions 560 and 562 of rotation stop 532 are arranged such that the reflector assembly 520 can be moved such that it positioned in two distinct locations.

The reflector assembly 520 is mated with switch base 540 to comprise the switch 500. Switch base 540 is arranged such that the reflector assembly 520 fits therein to allow the reflector assembly to rotate in an arcuate manner. Specifically, switch base 540 comprises a cavity 542 centrally located on the switch base 540 which is adapted to receive bearing assembly 538. When the reflector assembly is installed in the switch base 540, bearing assembly 538 fits snugly in cavity 542 and rotation stop 532 enters opening 545. Bounding opening 545 is stop walls 547 and 548 and back wall 549. Stop walls 547 and 548, in cooperation with rotation stop 532, act to control the arcuate rotation of the reflector assembly 520. Magnet 550 is disposed in switch base 540 such a portion extends into opening 545. The operation of magnet 550 will be discussed below. However, as seen in FIG. 19, when reflector assembly 520 is installed in switch base 540, it is close enough to magnet 535 such that the magnetic fields created by magnets 535 and 550 affect each other.

Disposed in the switch base 540 are first and second soft irons 564 and 566. First and second soft irons 564 and 566 are installed in the switch base 540 such that they extend externally from the switch base 540, into the core of the switch base 540 such that their ends (not shown) are located substantially close to the stop walls 547 and 548 inside the switch base 540. First and second soft irons 564 and 566, however, do not break through stop walls 547 and 548. In a slightly different embodiment, first and second soft irons 564 and 566 can be embodied as a single, U-shaped soft iron (not shown). A third soft iron 572 is disposed on the side of the switch base 540 opposing the first and second soft irons 564 and 566. Third soft iron 572 enters the switch base 540 but does not break through wall 549 and therefore does not enter opening 545.

Wrapped around first, second and third soft irons 564, 566 and 572 are wires 568, 570 and 574 respectively, which, as will be discussed below, are used to create the magnetic fields used to rotate the reflector assembly in the arcuate movement. The above described components can comprise a reflector assembly mover.

Figure 22:
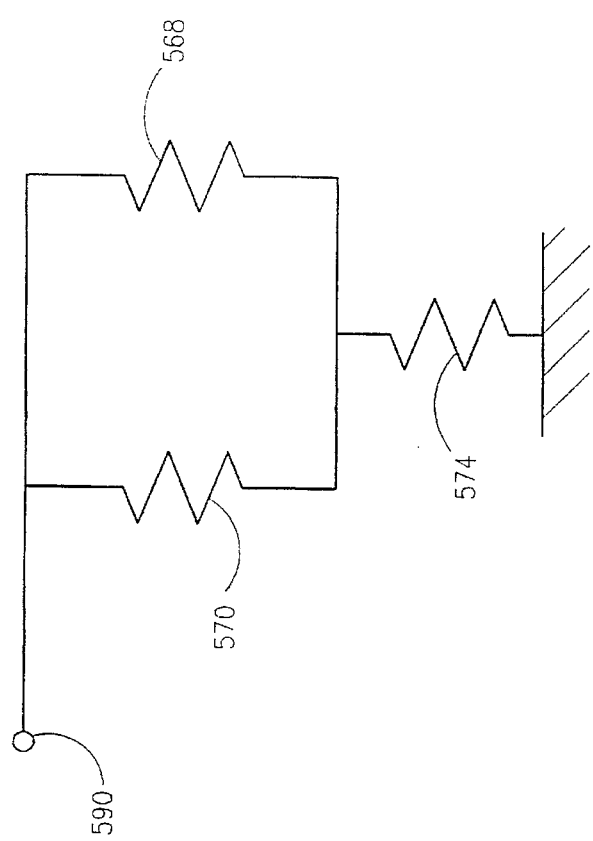
FIG. 22 is a simplified schematic of the circuit arrangement of the two-by-two fiber optic switch shown in FIGS. 18–21.

The operation of this embodiment of the invention will be discussed with reference to FIGS. 20 and 21, which shows how the application of power to the wires 568, 570 and 574 by power supply 590 can create magnetic fields, and therefore move the reflector assembly. In this embodiment (FIGS. 18–21), wires 568 and 570 arranged in a parallel circuit. Thus, the same power supply 590 is applied to both wires 568 and 570. Wire 574 is in series with wires 568 and 570. FIG. 22 shows a simplified schematic of the circuit arrangement of wires 568, 570 and 574. When power is applied to wires 568, 570 and 574, magnetic fields will be created. The polarity of the fields will be dependent upon the direction the wires 568, 570 and 574 are wound about the soft irons 564, 566 and 572. However, the polarity of magnets 535, 536 and 550 are fixed. The polarity of magnet 536 in the example shown in FIG. 20 is such that the portion that extends out of rotation stop 532 has a northern magnetic polarity and the portion within rotation stop 532 has a southern magnetic polarity. The polarity of magnet 535 in the example shown in FIG. 20 is such that the portion extend out of rotation stop 532 has a northern magnetic polarity and the portion within rotation stop 532 has a southern magnetic polarity. Magnet 550 has magnetic polarity such that the portion extending into opening 545 is northern and the portion within switch base 540 is southern.

Of course, the polarity selected for magnets 535, 536 and 550 can be reversed, and wires 568, 570 and 574 could be wound to create the opposite magnetic polarity about soft irons 564, 566 and 572 with equally satisfactory results.

FIG. 20 shows the polarity of the magnetic fields created when there is no power applied to any of the wires 568, 570 and 574, e.g., wires 568, 570 and 574 are connected to ground. In this case, because no power is applied to wires 568, 570 and 574, no magnetic fields are created at soft irons 564, 566 and 572. Because of this, the northern magnetic field created by magnet 550 repels the northern magnetic field created by magnet 535. This causes reflector assembly to rotate about support 528 and force the integral portion 562 of rotation stop 532 against stop wall 547. When the reflector assembly 520 is in this first position, first mirror 522 is disposed between the GRIN lens 18 affixed to first input fiber 10 and the GRIN lens 18 affixed to second output fiber 16.

When the reflector assembly 520 is in this first position, first mirror 522 is disposed between the GRIN lens 18 affixed to first input fiber 10 and the GRIN lens 18 affixed to second output fiber 16. In addition, second mirror 524 is disposed between the GRIN lens 18 affixed to second input fiber 12 and the GRIN lens 18 affixed to first output fiber 14. This causes optical signals from first input fiber 10 to travel in a manner shown in FIG. 23. Mirrors 522 and 524 have the structure described above. Specifically, the first input fiber 10 transmits a light signal through GRIN lens 18 that is incident on first mirror surface 580 of first mirror 522. Because of the angle in which first mirror surface 580 is disposed (preferably forty-five degrees with respect to the light signal), the light signal bounces off of first mirror surface 580 and is transmitted to second mirror surface 582 of second mirror 524. The second mirror surface 582 of second mirror 24 is disposed such that the parallel light signal is then transmitted to the GRIN lens 18 on first output fiber 14, thereby completing a light path through the switch 500.

Additionally, when reflector assembly 520 is in its first position, the second input fiber 12 transmits a parallel light signal that is incident upon first mirror surface 580 of the second mirror 524. Because of the angle in which first mirror surface 580 is disposed, the parallel light signal bounces off first mirror surface 580 and is transmitted to second mirror surface 582 of first mirror 522. The second mirror surface 582 of first mirror 522 is disposed such that the parallel light signal is then transmitted to the GRIN lens 18 on second output fiber 16, thereby completing another light path through the switch 500.

FIG. 21 shows the polarity of the magnetic fields created when power is applied to wires 568 and 570 and 574. In the example shown in FIG. 21, wire 568 is wound such that a southern magnetic field is created at that portion of the soft iron 564 inside the switch base 540. This southern magnetic field repels the southern magnetic field of the pole of magnet 535 located in rotation stop 532. This force acts to rotate the reflector assembly 520 about support 528.

In addition, wire 570 is wound such that a northern magnetic field is created at that portion of the soft iron 566 inside switch base 540. This northern magnetic field acts to attract to southern magnetic field of the pole of the magnet 536 located in rotation stop 532. This acts as an additional force to rotate the reflector assembly 520 about support 528.

Further, wire 574 is wound such that a northern magnetic field is created at that portion of the soft iron 572 inside switch base 540. This northern magnetic field acts to repel the northern magnetic field of the pole of the magnet 536 located in rotation stop 532. This provides even more force to rotate the reflector assembly 520 about support 528.

These forces cause the reflector assembly 520 to rotate about support 528 and force the integral portion 560 of rotation stop 532 against stop wall 548. When the reflector assembly 520 is in this second position, first mirror 522 and second mirror 524 are deflected such that they do not interfere with the paths of the light signals emerging from the first input fiber 10 and the second input fiber 12. This is clearly shown in FIG. 24, which shows the light signal paths of first input fiber 10 and second input fiber 12 travelling without reflection to second output fiber 16 and first output fiber 14 respectively.

When the power is removed from wires 568 and 570, the reflector assembly will move back to position one, shown in FIG. 23.

In the embodiments of FIGS. 18–23, wires 568 and 570 are arranged in parallel circuit configuration with each other while wire 574 is placed in series with wires 568 and 570. The reason for placing wires 568 and 570 in parallel is that by doing so, the magnetic field created by applying current to them is increased. The reason for this is that, while wires 568 and 570 are preferably high quality conductive wire, they will still have a measurable amount of resistance due to the number of windings around soft irons 564 and 566. When wires 568 and 570 are in parallel, this resistance of each of the windings can be increased without increasing the resistance encountered by the power supply 590. For example, If wires 568 and 570 are connected in serial circuit configuration, the resistances of wires 568 and 570 will be added. Thus, if wires 568 and 570 each have a resistance of twelve and one-half ohms, the total resistance of the circuit seen by the power supply 590 will be twenty-five ohms. On the other hand, if wires 568 and 570 are connected in parallel configuration, the resistance of wires 568 and 570 can be increased while maintaining the same resistance to the power supply 590. Thus, to maintain a total resistance of twenty-five ohms to the power supply, the resistance of wires 568 and 570 can be increased to fifty ohms.

The magnitude of the magnetic field is determined by the formula:

$$\Phi = NI$$

where N is the number of windings around the soft iron and I is the current in the wire. Since the ratio of windings (N) to resistance is somewhat linear, placing wires 568 and 570 in parallel allows them to have roughly four times as many windings (N). Thus, in the example shown, the number of windings necessary to increase the resistance of wires 568 and 570 from twelve and one-half ohms to fifty ohms will be approximately four times that required by the series circuit configuration.

Because the wires 568 and 570 are in parallel, the amount of current (I) in them will decrease by one-half due to ohms law. However, because the number windings (N) has increased four-fold, the magnitude of the magnetic field is doubled by a parallel circuit arrangement of wires 568 and 570.

Figure 25:
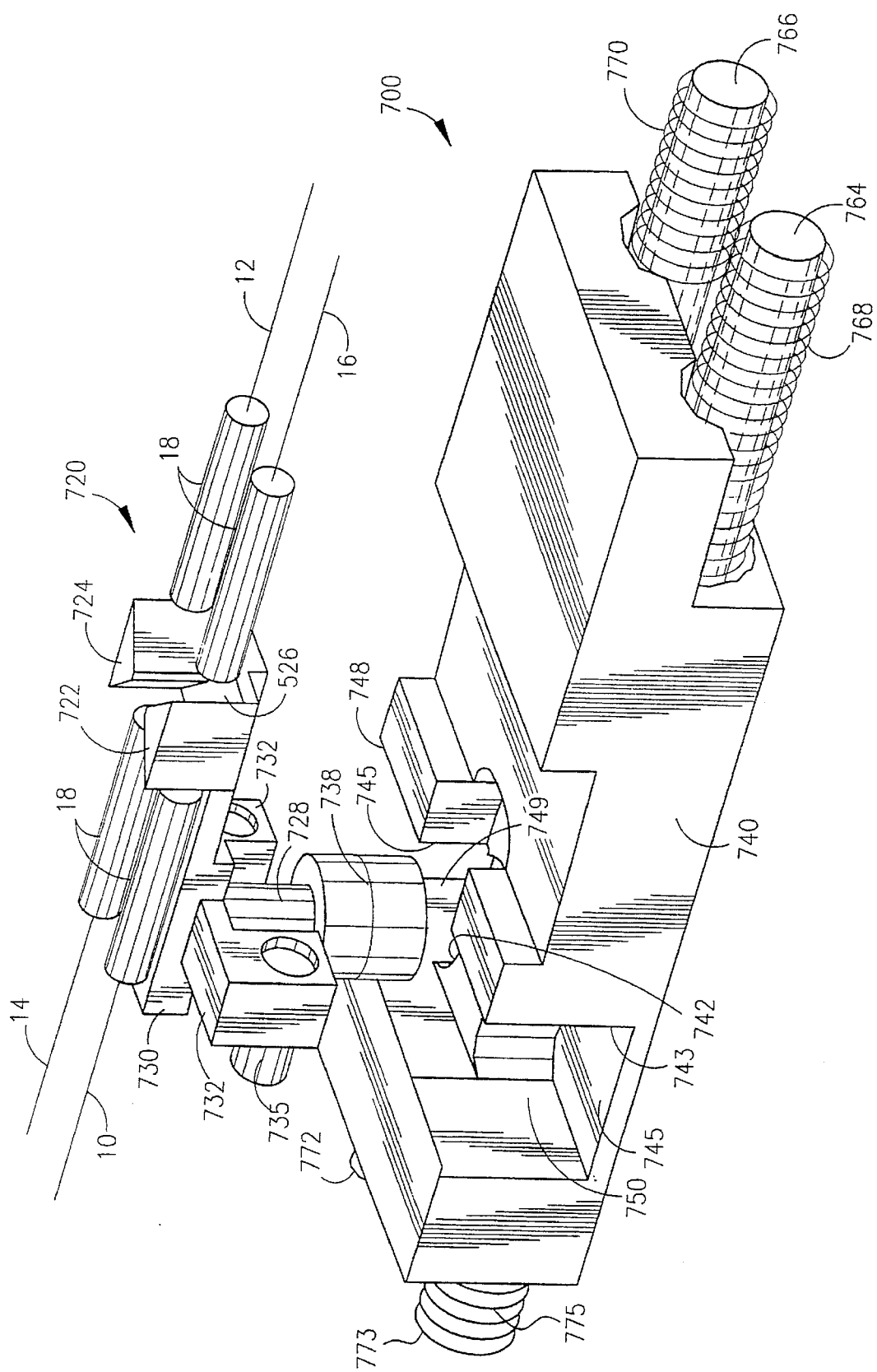
FIG. 25 is a perspective view of a two-by-two fiber optic switch made in accordance with the aspects of the invention.

Referring now to FIGS. 25–28, yet another embodiment of the present invention will be disclosed. FIG. 25 shows a perspective view and FIGS. 26–27 show a schematic view. In the embodiments of FIGS. 25–28, the switch 700 comprises first input fiber 10, a second input fiber 12, a first output fiber 14 and a second output fiber 16 with GRIN lenses 18. The switch 700 has a reflector assembly 720 comprising a first mirror 722, a second mirror 724 and a base 726. The first mirror 722 and second mirror 724 are affixed to reflector base 726. In the preferred embodiment, both the first mirror 722 and the second mirror 724 have triangular shapes. When the reflector assembly 720 is in the light path, as will be described, the first mirror 722 is located between first input fiber 10 and second output fiber 16 while second mirror 724 is located between second input fiber 12 and first output fiber 14. Reflector base 726 has an axial portion 730 that is connected to a support 728 and rotation stop 732. Support 728 is rotatably mounted in bearing assembly 738.

As seen in FIGS. 26 and 27, rotation stop 732 holds magnets 735 and 736 (seen only in FIG. 26) in the reflector assembly 720. Magnets 735 and 736 are installed such that a portion of them exists within the rotation stop 732 and a portion of them exists external to rotation stop 732. The shape of rotation stop 732 is best seen with reference to FIGS. 26–27. Rotation stop 732 has two preferably integral portions 760 and 762, with one part deflected from the axis of the other portion. As will be discussed in more detail below, the integral portions 760 and 762 of rotation stop 732 are arranged such that the reflector assembly 720 can be moved such that it positioned in two distinct locations.

The reflector assembly 720 is mated with switch base 740 to comprise the switch 700. Switch base 740 is arranged such that the reflector assembly 720 fits therein to allow the reflector assembly to rotate in an arcuate manner. Specifically, switch base 740 comprises a cavity 742 centrally located on the switch base 740 which is adapted to receive bearing assembly 738. When the reflector assembly 720 is installed in the switch base 740, bearing assembly 738 fits snugly in cavity 742 and rotation stop 732 enters opening 745. Bounding opening 745 is stop wall 747 and stop wall 749. Stop wall 747, in cooperation with rotation stop 732, acts to control the arcuate rotation of the reflector assembly 720.

Disposed in the switch base 740 are first and second soft irons 764 and 766. First and second soft irons 764 and 766 are installed in the switch base 740 such that they extend externally from the switch base 740, into the core of the switch base 740 such that their ends (not shown) are located substantially close to the stop walls 747 and 748 inside the switch base 540. First and second soft irons 764 and 766, however, preferably do not break through stop walls 747 and 748. A third and fourth soft irons 772 and 773 are disposed on the side of the switch base 740 opposing the first and second soft irons 764 and 766. Third and fourth soft irons 772 and 773 enter the switch base 740 but preferably do not break through wall 749 and therefore do not enter opening 745.

Figure 28:
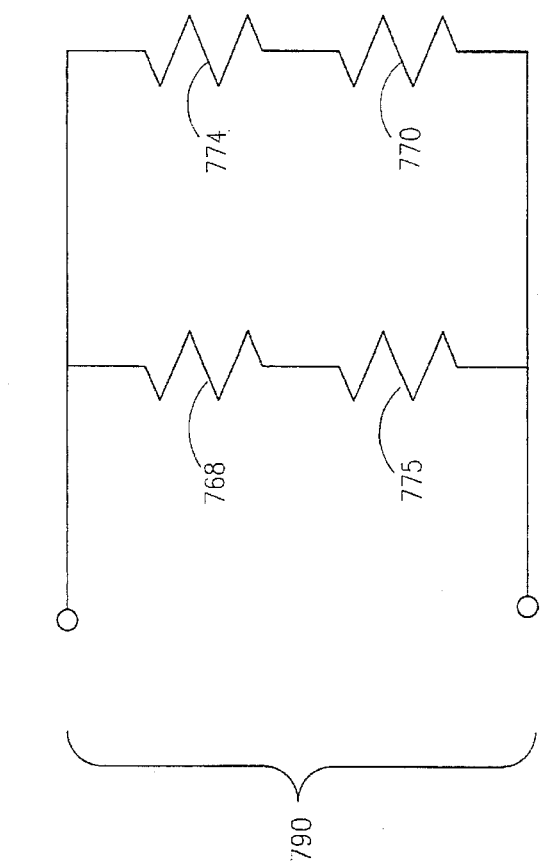
FIG. 28 is a simplified schematic of the circuit arrangement of the two-by-two fiber optic switch shown in FIGS. 25–27.

Wrapped around first, second, third and fourth soft irons 764, 766, 772 and 773 are wires 768, 770, 774 and 775 respectively, which, as will be discussed below, are used to create the magnetic fields used to rotate the reflector assembly in the arcuate movement. The above described components can comprise a reflector assembly mover. For reasons which will be discussed below, wire 768 is in series circuit configuration with wire 775, and wire 770 is in series circuit configuration with wire 774. The series circuit comprising wires 768 and 775 is in parallel with the series circuit comprising wires 770 and 774. FIG. 28 shows a simplified schematic of the circuit arrangement of wires 768, 770, 772, and 775.

This parallel circuit arrangement, like the embodiment of FIGS. 18–23, discussed above, is used to increase the magnitude of the magnetic field created by the wires 768, 770, 772, and 775 because, as discussed above, it allows the number of windings to increase, which will increase the magnitude of the magnetic field created, while at the same time allowing the resistance presented to the power supply 790 to remain low.

The operation of this embodiment of the invention will be discussed with reference to FIGS. 26 and 27, which show how the application of power to the wires 768, 770, 774 and 775 can create magnetic fields, which cause the reflector assembly 720 to move. In the embodiment of FIGS. 25–28, the portions of magnets 735 and 736 emerging from rotation stop 732 have a northern magnetic polarity and the portions of magnets 735 and 736 embedded within rotation stop 732 have a southern magnetic polarity.

In this embodiment, when no power is applied to the wires 768, 770, 774 and 775, there are no magnetic fields created about soft irons 764, 766, 772 and 773. Thus, there are no magnetic fields to oppose the magnetic fields created by magnets 735 and 736. When no power is applied to wires 768, 770, 774 and 775, the stopper 732 will remain in the position it was last in prior to the power being removed. However, it is the polarity of the last voltage supplied to the switch 700 that will determine the position of the reflector assembly 720.

FIG. 26 shows the position of the reflector assembly 720 when the polarity of the voltage supplied to the switch 700 is such that a positive voltage is applied to wires 768 and 772. In the embodiment shown, wire 774 is wound such that current in this direction creates a southern magnetic field about the portion of soft iron 772 opposite the portion of magnet 736 emerging from rotation stop 732, which has a northern magnetic polarity. Thus, magnet 736 is attracted to soft iron 772, which causes rotation stop 732 to rotate in arcuate rotation about support 728 and bearing assembly 738 until portion 762 of rotation stop 732 makes contact with stop wall 747. In addition, wire 770 is wound such that current in this direction creates a southern magnetic field about the portion of soft iron 766 opposite the portion of magnet 736 embedded within rotation stop 732, which has a southern magnetic polarity. Thus, magnet 736 is repelled by soft iron 772, which causes rotation stop 732 to rotate in arcuate rotation about support 728 and bearing assembly 738 until portion 762 of rotation stop 732 makes contact with stop wall 747.

Furthermore, in the embodiment of FIGS. 25–28, wire 775 is wound such that current in this direction creates a northern magnetic field about the portion of soft iron 773 opposite the portion of magnet 735 emerging from rotation stop 732, which also has a northern magnetic polarity. Thus, magnet 735 is repelled by soft iron 773, which causes rotation stop 732 to rotate in arcuate rotation about support 728 and bearing assembly 738 until portion 762 of rotation stop 732 makes contact with stop wall 747. In addition, wire 768 is wound such that current in this direction creates a northern magnetic field about the portion of soft iron 764 opposite the portion of magnet 735 embedded within rotation stop 732, which has a southern magnetic polarity. Thus, magnet 735 is attracted to soft iron 764, which causes rotation stop 732 to rotate in arcuate rotation about support 728 and bearing assembly 738 until portion 762 of rotation stop 732 makes contact with stop wall 747.

Thus, applying power to the switch 700 in this manner causes the reflector assembly 720 to move to a first position. When the reflector assembly 720 is in this first position, first mirror 722 is disposed between the GRIN lens 18 affixed to first input fiber 10 and the GRIN lens 18 affixed to second output fiber 16. Further, when reflector assembly 720 is in this first position, the second mirror 724 is disposed between the GRIN lens 18 affixed to second input fiber 12 and the GRIN lens 18 affixed to first output fiber 14. To see the path of light signals when the reflector assembly 720 is in this first position, reference is made to FIG. 23.

FIG. 27 shows the position of the reflector assembly 720 when the polarity of the voltage supplied to the switch 700 is such that a positive voltage is applied to wires 775 and 770. In the embodiment shown, wire 775 is wound such that current in this direction creates a southern magnetic field about the portion of soft iron 773 opposite the portion of magnet 735 emerging from rotation stop 732, which has a northern magnetic polarity. Thus, magnet 735 is attracted to soft iron 773, which causes rotation stop 732 to rotate in arcuate rotation about support 728 and bearing assembly 738 until portion 760 of rotation stop 732 makes contact with stop wall 748. In addition, wire 768 is wound such that current in this direction creates a southern magnetic field about the portion of soft iron 764 opposite the portion of magnet 735 embedded within rotation stop 732, which has a southern magnetic polarity. Thus, magnet 735 is repelled by soft iron 764, which causes rotation stop 732 to rotate in arcuate rotation about support 728 and bearing assembly 738 until portion 760 of rotation stop 732 makes contact with stop wall 748.

Furthermore, in the embodiment of FIGS. 25–28, wire 774 is wound such that current in this direction creates a northern magnetic field about the portion of soft iron 772 opposite the portion of magnet 736 emerging from rotation stop 732, which also has a northern magnetic polarity. Thus, magnet 736 is repelled by soft iron 772, which causes rotation stop 732 to rotate in arcuate rotation about support 728 and bearing assembly 738 until portion 760 of rotation stop 732 makes contact with stop wall 748. In addition, wire 770 is wound such that current in this direction creates a northern magnetic field about the portion of soft iron 766 opposite the portion of magnet 736 embedded within rotation stop 732, which has a southern magnetic polarity. Thus, magnet 736 is attracted to soft iron 766, which causes rotation stop 732 to rotate in arcuate rotation about support 728 and bearing assembly 738 until portion 760 of rotation stop 732 makes contact with stop wall 748.

Thus, applying power to the switch 700 in the manner of FIG. 27 causes the reflector assembly 720 to move to a second position. When the reflector assembly 720 is in this second position, first mirror 522 and second mirror 524 are deflected such that they do not interfere with the paths of the light signals emerging from the first input fiber 10 and the second input fiber 12. To see the path of light signals when the reflector assembly 720 is in this second position, reference is made to FIG. 24.

The embodiments of FIGS. 18–22 and 25–28 can also be used to form a one-by-two switch, which would have one input and two possible outputs, and vic-versa. The arrangement of the mirrors 822 and 824 of such a switch 800 are shown in FIGS. 29–30. Specifically, mirrors 822 and 824 each have a single flat, front coated mirror surface 832 and 830, respectively. FIG. 29 shows the switch 800 with the reflector assembly (only the mirrors 822 and 824 of the reflector assembly are shown) in a second position. When the mirrors 822 and 824 are in this second position, a light signal travels from optical input fiber 810, through GRIN lens 816, through the space between GRIN lens 816 and 818, through GRIN lens 818, to optical output fiber 812. No reflection takes place.

FIG. 30 shows the path of light signals when the reflector assembly containing mirrors 822 and 824 is moved to the first position. When the mirrors 822 and 824 are in this first position, a light signal travels from optical input fiber 810, through GRIN lens 816. It is reflected off mirror surface 830 of mirror 824 to mirror surface 832 of mirror 822, and off mirror surface 832 to GRIN lens 814. The light signal passes through GRIN lens 820, to optical output fiber 812. Thus, a light signal input to switch 800 when the reflector assembly is in the first position will reflect of two mirror surfaces (mirror surfaces 830 and 832) to arrive at the output.

The shape of mirrors 822 and 824 is important. Specifically, in the embodiment shown, the mirror surfaces 830 and 832 must be disposed at a forty-five degree angle with respect to light signals that are incident upon it. If there is any misalignment caused by improper angles, large insertion losses can occur, which are undesirable.

Figure 31:
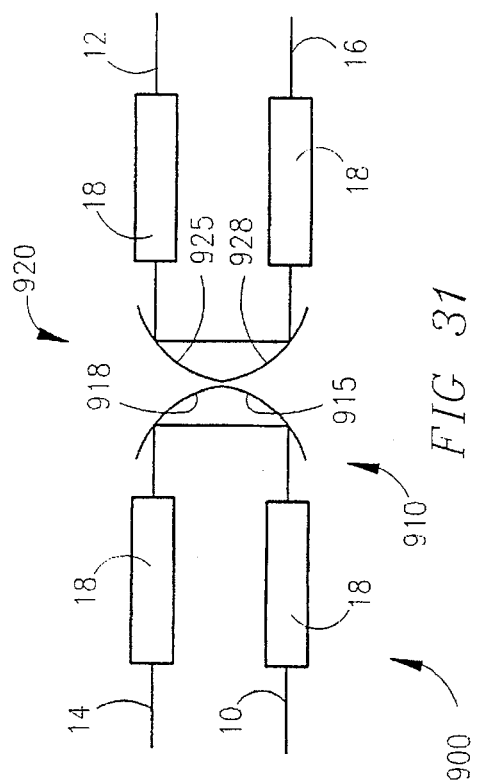
FIG. 31 is a top schematic view of a two-by-two fiber optic switch embodiment of the present invention showing optical light paths when an alternative mirror arrangement is in a first position.
Figure 32:
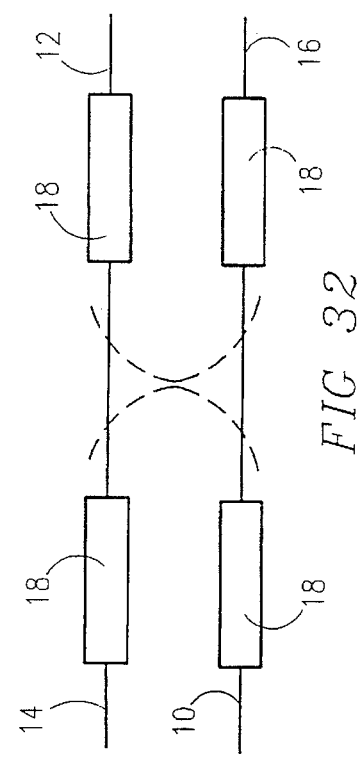
FIG. 32 is a top schematic view of a two-by-two fiber optic switch embodiment of the present invention showing optical light paths when an alternative mirror arrangement is in a second position.

FIGS. 31–32 show an alternate configuration for the reflector assembly used in the switch of the present invention. FIGS. 31–32 show a switch 900 where the reflector assembly is comprised of a first one-piece curved mirror 910 and a second one-piece curved mirror 920. The first and second one-piece mirrors can be shaped as a parabolic, arc, semi-circular and still operate using the concepts of the present invention.

When the first and second one piece curved mirrors 910 and 920 are in the first position (shown in FIG. 31), they are placed such that they are in the light path created by the first input fiber 10, second input fiber 12, first output fiber 14 and second output fiber 16. Specifically, when the first and second one piece curved mirrors 910 and 920 are in the first position, the light path of a light signal emerging from the first input fiber 10 is as follows. The light signal is transmitted by the first input fiber 10 such that it is reflected off a first mirror surface 915 of first one-piece mirror 910. The reflected light signal then bounces off of second mirror surface 918 of second one-piece mirror 910 such that it is transmitted to first output fiber 14. The light path of a light signal transmitted by second output fiber 12 is similar. The light signal is transmitted by the second input fiber 12 such that it is reflected off first mirror surface 925 of second one-piece mirror 920. The reflected light signal then bounces off of the second mirror surface 928 of the second one-piece mirror 920 such that it is transmitted to second output fiber 16. GRIN lenses 18 are preferably used in the manner discussed above.

When the first and second one piece curved mirrors 910 and 920 are moved to second position (shown in FIG. 32), the first one-piece mirror 910 and second one-piece mirror 920 move such that they are no longer in the light path, thereby creating a situation where no reflection takes place. Therefore, the light signals transmitted by first input fiber 10 and second input fiber 12 are transmitted directly to second output fiber 16 and first output fiber 14, respectively.

FIGS. 33–34 show yet another alternate configuration for the reflector assembly used in the switch of the present invention. FIGS. 33–34 show a switch 1000 where the reflector assembly is comprised of a first mirror 1010, a second mirror 1012, a third mirror 1020 and a fourth mirror 1022. First mirror 1010, second mirror 1012, third mirror 1020 and fourth mirror 1022 can be shaped as a flat, parabolic, arc, or semi-circular mirror and still operate using the concepts of the present invention.

When first mirror 1010, second mirror 1012, third mirror 1020 and fourth mirror 1022 are in the first position (shown in FIG. 33), they are placed such that they are in the light path created by the first input fiber 10, second input fiber 12, first output fiber 14 and second output fiber 16. Specifically, when first mirror 1010, second mirror 1012, third mirror 1020 and fourth mirror 1022 the are in the first position, the light path of a light signal emerging from the first input fiber 10 is as follows. The light signal is transmitted by the first input fiber 10 such that it is reflected off mirror surface 1015 of first mirror 1010. The reflected light signal then bounces off of mirror surface 1018 of second mirror 1012 such that it is transmitted to first output fiber 14. The light path of a light signal transmitted by second output fiber 12 is similar. The light signal is transmitted by the second input fiber 12 such that it is reflected off mirror surface 1025 of third one-piece mirror 1022. The reflected light signal then bounces off of the mirror surface 1028 of fourth mirror 1020 such that it is transmitted to second output fiber 16. GRIN lenses 18 are preferably used in the manner discussed above.

When the first mirror 1010, second mirror 1012, third mirror 1020 and fourth mirror 1022 are moved to second position, they move to a location such that they are no longer in the light path, thereby creating a situation where no reflection takes place. Therefore, the light signals transmitted by first input fiber 10 and second input fiber 12 are transmitted directly to second output fiber 16 and first output fiber 14, respectively.

Figure 35:
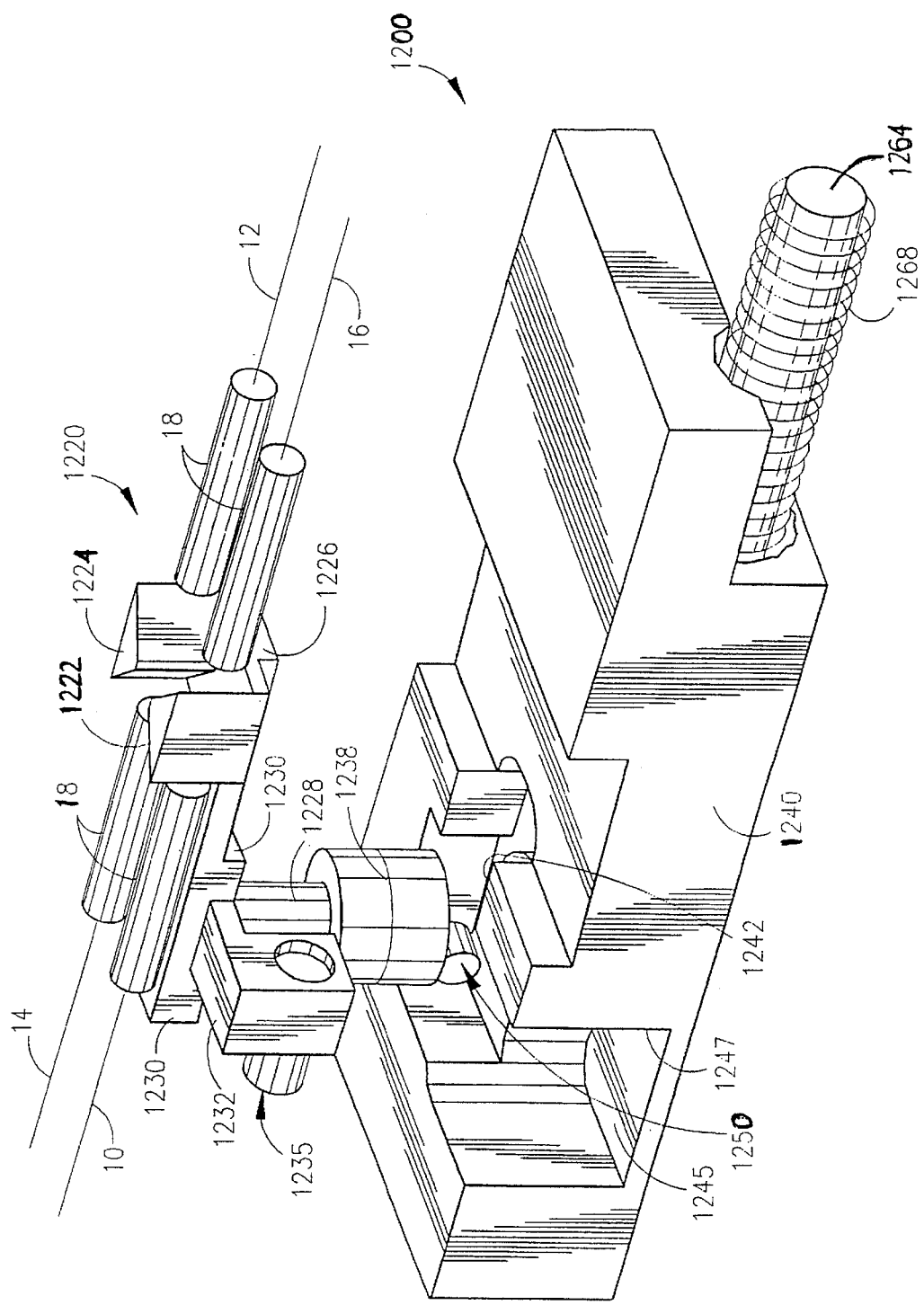
FIG. 35 is a perspective view of a two-by-two fiber optic switch made in accordance with the aspects of the invention.

FIGS. 35–37 show a schematic diagram of yet another embodiment of the present invention. FIG. 35 shows a perspective view and FIGS. 36–37 show a schematic view. In the embodiment of FIGS. 35–37, the switch 1200 comprises first input fiber 10, a second input fiber 12, a first output fiber 14 and a second output fiber 16 with GRIN lenses 18. The switch 1200 has a reflector assembly 1220 comprising a first mirror 1222, a second mirror 1224 and a base 1226. The first mirror 1222 and second mirror 1224 are affixed to reflector base 1226. In this embodiment, both the first mirror 1222 and the second mirror 1224 preferably have triangular shapes. When the reflector assembly 1220 is in the light path, as will be described, the first mirror 1222 is located between first input fiber 10 and second output fiber 16 while second mirror 1224 is located between second input fiber 12 and first output fiber 14. Reflector base 1226 has an axial portion 1230 that is connected to a support 1228 and rotation stop 1232. Support 1228 is rotatably mounted in bearing assembly 1238.

As seen in FIGS. 36–37, rotation stop 1232 holds magnet 1235 in the reflector assembly 1220. Magnet 1235 is installed such that a portion of it exists within the rotation stop 1232 and a portion exists external to rotation stop 1232. The shape of rotation stop 1232 is best seen with reference to FIGS. 36–37. Rotation stop 1232 has an integral portion 1260. As will be discussed in more detail below, the integral portion 1260 of rotation stop 1232 is arranged such that the reflector assembly 1220 can be moved such that it positioned in two distinct locations.

The reflector assembly 1220 is mated with switch base 1240 to comprise the switch 1200. The switch base 1240 is arranged such that the reflector assembly 1220 fits therein to allow the reflector assembly 1220 to rotate in an arcuate manner. Specifically, switch base 1240 comprises a cavity 1242 centrally located on the switch base 1240 which is adapted to receive bearing assembly 1238. When the reflector assembly 1220 is installed in the switch base 1240, bearing assembly 1238 fits snugly in cavity 1242 and rotation stop 1232 enters opening 1245. A screw stop 1250 is installed in base 1240 which acts to control the arcuate rotation of the reflector assembly 1220. Screw stop 1250 is preferably adjustable so that the position in which the reflector assembly stops rotation can be accurately set.

Disposed in the switch base 1240 is a soft iron 1264. Soft iron 1264 is installed in the switch base 1240 such that it extends into the core of the switch base 1240 so that one end 1265 is located substantially close to a stop wall 1247 bounding opening 1245 inside the switch base 1240, much like the stop walls of the previously discussed embodiments. Soft iron 1264, however, preferably does not break through the stop wall 1247.

Wrapped around soft iron 1264 is wire 1268, which, as will be discussed below, is used to create the magnetic fields used to rotate the reflector assembly in the arcuate movement. The above described components can comprise a reflector assembly mover.

FIGS. 36–37 show how the application of power to the wire 1268 by power supply 1290 can create a magnetic field, and therefore move the reflector assembly. FIG. 36 shows the positioning of the reflector assembly 1220 when no power is applied to wire 1268. The polarity of magnet 1235 in the example shown in FIGS. 35–37 is such that the portion extending out of rotation stop 1232 has a northern magnetic polarity and the portion within rotation stop 1232 has a southern magnetic polarity.

FIG. 36 shows the polarity of the magnetic field created when there is no power applied to wire 1268, e.g., wire 1268 is connected to ground. In this case, because no power is applied to wire 1268, no magnetic field is created about soft iron 1264. Because of this, no magnetic fields are present to interact with magnet 1235. Thus, the reflector assembly 1220 will not rotate about support 1228. Instead, rotation stop 1232 will rest against stop wall 1247. The reflector assembly 1220 can be spring loaded by a biasing force (not shown) to remain in a certain position when there is no power applied by power supply 1290. In the embodiment shown in FIG. 36, the reflector assembly 1220 is biased in such a manner as to position the reflector assembly 1220 such that first mirror 1222 is disposed between the GRIN lens 18 affixed to first input fiber 10 and the GRIN lens 18 affixed to second output fiber 16, and such that second mirror 1224 is disposed between the GRIN lens 18 affixed to second input fiber 12 and first output fiber 14.

When the reflector assembly 1220 is in this first position, optical signals from first input fiber 10 travel in a manner like that shown in FIG. 23. Mirrors 1222 and 1224 preferably have the structure described in the embodiments discussed above.

FIG. 37 shows the polarity of the magnetic fields created when power is applied to wire 1268 by power supply 1290. In the embodiment shown in FIG. 37, wire 1268 is wound such that a southern magnetic field is created at that portion 1265 of soft iron 1264 inside the switch base. This southern magnetic field repels the southern magnetic field of the pole of magnet 1235 located in rotation stop 1232. This force acts to rotate the reflector assembly 1220 about support 1228.

When the reflector assembly 1220 rotates about support 1228, stop 1251 of reflector assembly base 1226 rotates against the screw stop 1250, thereby placing the reflector assembly into a second position. When the reflector assembly 1220 is in this second position, first mirror 1222 and second mirror 1224 are deflected such that they do not interfere with the paths of the light signals emerging from the first input fiber 10 and the second input fiber 12. These optical paths can be clearly shown with reference to FIG. 24, which shows the light signal paths of first input fiber 10 and second input fiber 12 travelling without reflection to second output fiber 16 and first output fiber 14 respectively.

When the power is removed from wire 1268, the bias provided the reflector assembly 1220 will cause it to rotate back to position one, which, as discussed, is shown in FIG. 36.

Of course, the polarity selected for magnet 1235 can be reversed, and wire 1268 could be wound such as to create the opposite magnetic polarity about soft iron 1264 with equally satisfactory results.

Figure 38:
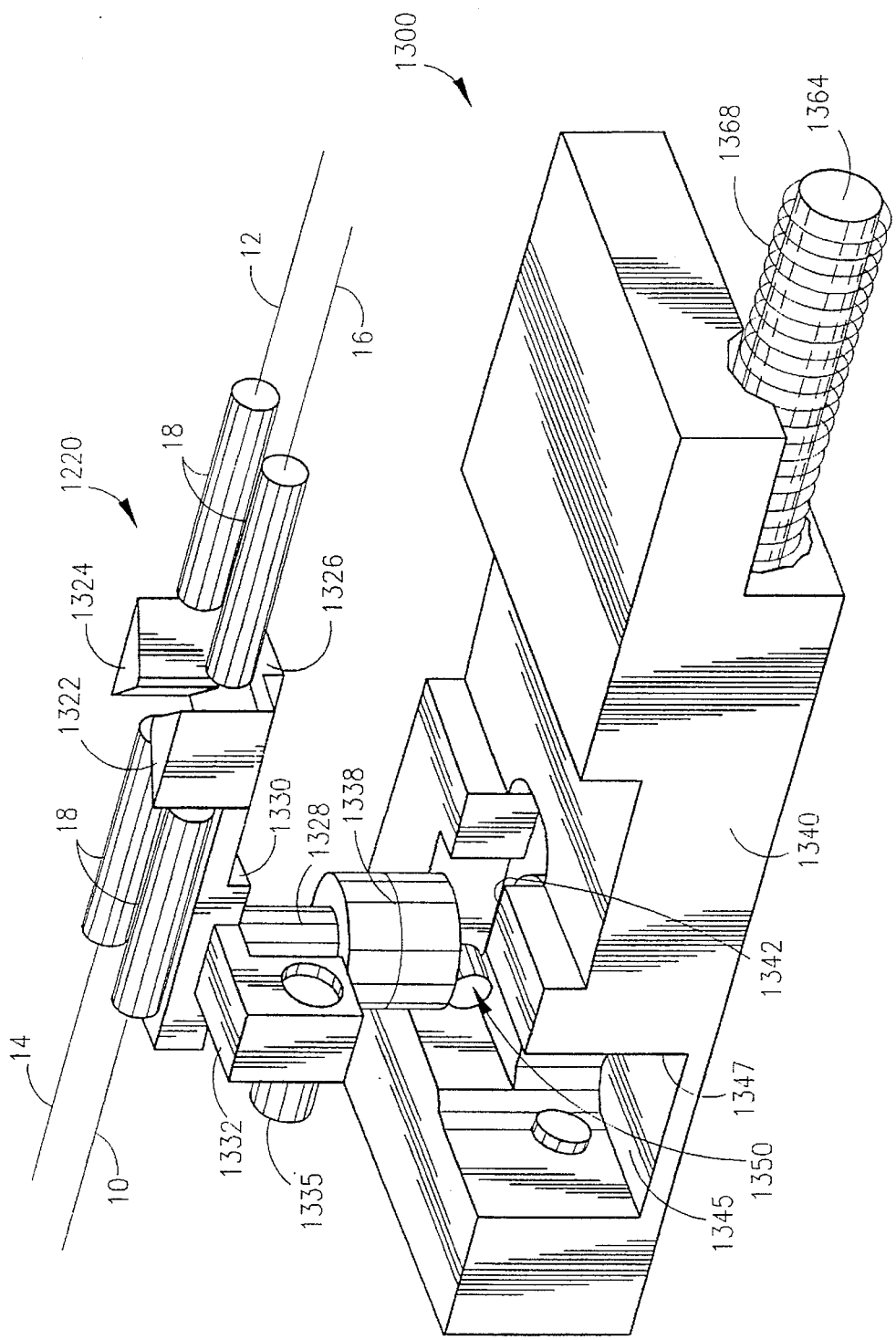
FIG. 38 is a perspective view of another two-by-two fiber optic switch made in accordance with the aspects of the invention.
Figure 39:
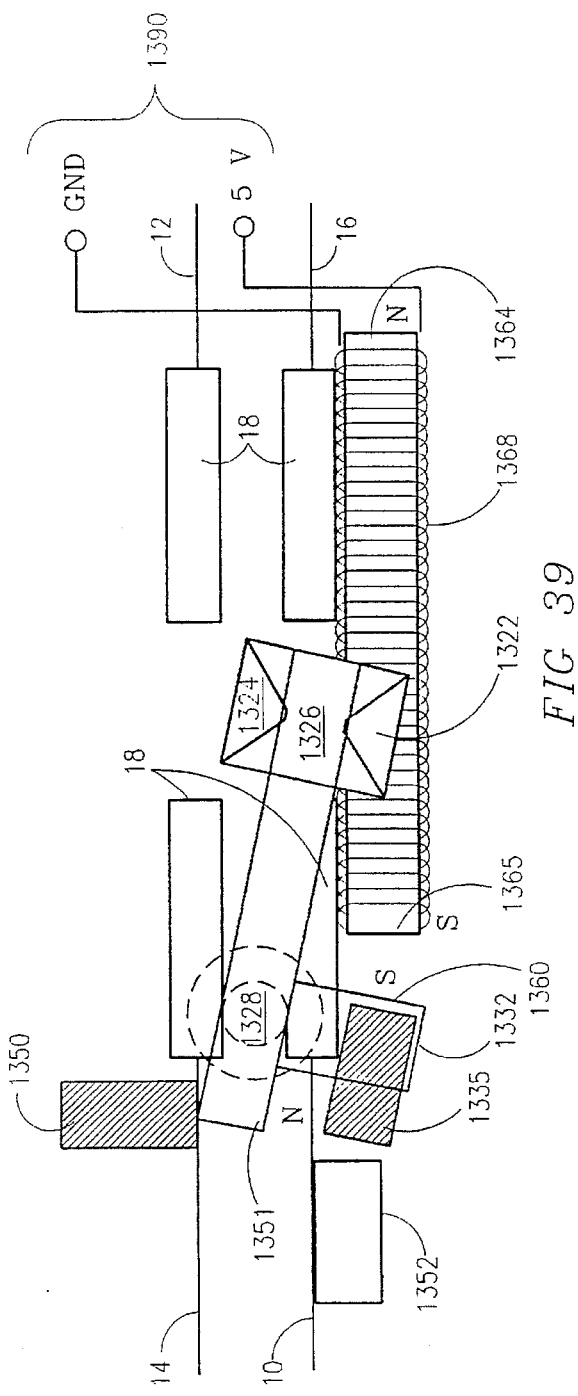
FIG. 39 is a schematic view of the two-by-two fiber optic switch shown in FIG. 38 with the reflector assembly in a second position.
Figure 40:
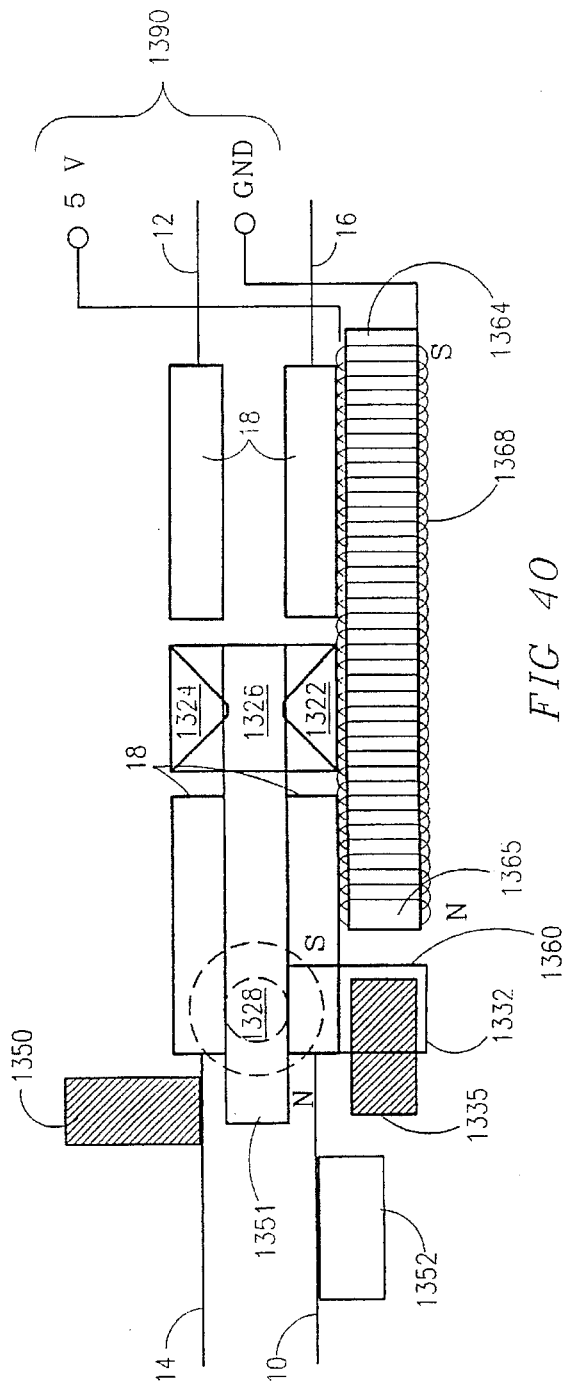
FIG. 40 is a schematic view of the two-by-two fiber optic switch shown in FIG. 38 with the reflector assembly in a first position.

FIGS. 38–40 show a schematic diagram of yet another embodiment of the present invention. FIG. 38 shows a perspective view and FIGS. 39–40 show a schematic view. In the embodiment of FIGS. 38–40, the switch 1300 comprises first input fiber 10, a second input fiber 12, a first output fiber 14 and a second output fiber 16 with GRIN lenses 18. The switch 1300 has a reflector assembly 1320 comprising a first mirror 1322, a second mirror 1324 and a base 1326. The first mirror 1322 and second mirror 1324 are affixed to reflector base 1326. In this embodiment, both the first mirror 1322 and the second mirror 1324 preferably have triangular shapes. When the reflector assembly 1320 is in the light path, as will be described, the first mirror 1322 is located between first input fiber 10 and second output fiber 16 while second mirror 1324 is located between second input fiber 12 and first output fiber 14. Reflector base 1326 has an axial portion 1330 that is connected to a support 1328 and rotation stop 1332. Support 1328 is rotatably mounted in bearing assembly 1338.

As seen in FIGS. 39–40, rotation stop 1332 holds magnet 1335 in the reflector assembly 1320. Magnet 1335 is installed such that a portion of it exists within the rotation stop 1332 and a portion exists external to rotation stop 1332. The shape of rotation stop 1332 is best seen with reference to FIGS. 39–40. Rotation stop 1332 has an integral portion 1360. As will be discussed in more detail below, the integral portion 1360 of rotation stop 1332 is arranged so that the reflector assembly 1320 can be moved to two distinct positions.

The reflector assembly 1320 is mated with switch base 1340 to comprise the switch 1300. The switch base 1340 is arranged such that the reflector assembly 1320 fits therein to allow the reflector assembly 1320 to rotate in an arcuate manner. Specifically, switch base 1340 comprises a cavity 1342 centrally located on the switch base 1340 which is adapted to receive bearing assembly 1338. When the reflector assembly 1320 is installed in the switch base 1340, bearing assembly 1338 fits snugly in cavity 1342 and rotation stop 1332 enters opening 1345. A screw stop 1350 is installed in base 1340 which acts to control the arcuate rotation of the reflector assembly 1320. Screw stop 1350 is preferably adjustable so that the position in which the reflector assembly stops rotation can be accurately set.

Disposed in the switch base 1340 is a soft iron 1364. Soft iron 1364 is installed in the switch base 1340 such that it extends into the core of the switch base 1340 so that one end 1365 is located substantially close to a stop wall 1347 bounding opening 1345 inside the switch base 1340, much like the stop walls of the previously discussed embodiments. Soft iron 1364, however, preferably does not break through the stop wall 1347.

Wrapped around soft iron 1364 is wire 1368, which, as will be discussed below, is used to create the magnetic fields used to rotate the reflector assembly in the arcuate movement.

Soft iron 1352 is disposed in switch base 1340 such a portion extends into opening 1345. The operation of soft iron 1352 will be discussed below.

FIGS. 39–40 show how the application of power to the wire 1368 by power supply 1390 can create a magnetic field, and therefore move the reflector assembly.

FIG. 39 shows the polarity of the magnetic fields created when power of a first polarity is applied to wire 1368 by power supply 1390. In the embodiment shown in FIG. 39, wire 1368 is wound such that a southern magnetic field is created at that portion 1365 of soft iron 1364 inside the switch base. This southern magnetic field repels the southern magnetic field of the pole of magnet 1335 located in rotation stop 1332. This force acts to rotate the reflector assembly 1320 about support 1328.

When the reflector assembly 1320 rotates about support 1328, stop 1351 of reflector assembly base 1326 rotates against the screw stop 1350, thereby placing the reflector assembly into a second position. When the reflector assembly 1320 is in this second position, first mirror 1322 and second mirror 1324 are deflected such that they do not interfere with the paths of the light signals emerging from the first input fiber 10 and the second input fiber 12. These optical paths can be clearly shown with reference to FIG. 24, which shows the light signal paths of first input fiber 10 and second input fiber 12 travelling without reflection to second output fiber 16 and first output fiber 14 respectively.

In addition, when reflector assembly 1320 is deflected to the second position, the northern magnetic field of the pole of magnet 1335 extending out of rotation stop 1332 becomes attracted to soft iron 1352. The force of this attraction is strong enough to overcome the bias applied to reflector assembly 1320 which tends to maintain the reflector assembly in the first position. Thus, when power is applied as in the embodiment of FIG. 40, the reflector assembly will be maintained in the second position, regardless of whether the power is maintained. An advantage of this arrangement is that a user need only provide a short pulse of power to move the reflector assembly to the second position, and then the power can be turned off. This reduces the amount of power required to use the switch and increases long-term reliability.

FIG. 40 shows the position of the reflector assembly 1320 when the polarity of the power supplied by power supply 1390 is reversed. When the polarity of the power supplied by power supply 1390 is reversed, wire 1368 is wound such that a northern magnetic field is created at that portion 1365 of soft iron 1364 inside the switch base. This northern magnetic field acts to attract the southern magnetic field of the pole of magnet 1335 located in rotation stop 1332. This attraction is strong enough to overcome the attraction between the northern pole of magnet 1335 and soft iron 1352. This force acts to rotate the reflector assembly 1320 about support 1328.

The reflector assembly 1320 can be spring loaded by a biasing force (not shown) to maintain the reflector assembly 1320 in the first position when no power is applied by power supply 1390. In the embodiment shown in FIGS. 38–40, the reflector assembly 1320 is biased in such a manner as to position the reflector assembly 1320 such that first mirror 1322 is disposed between the GRIN lens 18 affixed to first input fiber 10 and the GRIN lens 18 affixed to second output fiber 16, and such that second mirror 1324 is disposed between the GRIN lens 18 affixed to second input fiber 12 and first output fiber 14. Because the reflector assembly 1320 is biased to remain in this first position, only a relatively short pulse of power in this second polarity need be applied to the switch 1300 by power supply 1390 because after power is turned off, the bias provided to the reflector assembly 1320 will maintain the switch in the first position. When the reflector assembly 1320 is in this first position, optical signals from first input fiber 10 travel in a manner like that shown in FIG. 23. Mirrors 1322 and 1324 preferably have the structure described in the embodiments discussed above.

Of course, the polarity selected for magnet 1335 can be reversed, and wire 1368 could be wound such as to create the opposite magnetic polarity about soft iron 1364 with equally satisfactory results.

It should be noted that all embodiments of the invention can be constructed so that they are stacked as a plurality of two-by-two switches. This will allow multiple data lines to be operated by a single mechanism.

Having thus described my invention, what I claim as new and desire to secure by Letters Patent of the United States of America is:

1. A fiber optic switch comprising:

a base having a first end and a second end;

a first input fiber, a second input fiber, a first output fiber and a second output fiber, said first input fiber being arranged so that it is substantially collinear with said second output fiber and adjacent and substantially parallel to said first output fiber, said second input fiber being arranged so that it is substantially collinear with said first output fiber and adjacent and substantially parallel to said second output fiber;

a grade reflective index (GRIN) lens disposed on said first input fiber, said second input fiber, said first output fiber and said second output fiber;

a movable reflector assembly installed to said base, said movable reflector assembly comprising:

a first reflector and a second reflector disposed on a reflector base, said reflector base extending axially to a downwardly extending support, said support rotatably mounted to a bearing, said bearing mounted to said base, said first reflector and said second reflector comprising a first reflector-first reflector surface, a first reflector-second reflector surface, a second reflector-first reflector surface and a second reflector-second reflector surface, wherein said first reflector-first reflector surface and said first reflector-second reflector surface have an angle of X degrees between them and wherein said second reflector-first reflector surface and said second reflector-second reflector surface have and angle of one-hundred eighty degrees minus X degrees between them so that said first reflector-second reflector surface and said second reflector-first reflector surface are disposed at ninety degree angles and said first reflector-first reflector surface and said second reflector-second reflector surface are also disposed at ninety degree angles;

said movable reflector assembly further comprising a rotation stop mounted about said support, said rotation stop having a first stop portion and a second stop portion, said first stop portion deflected from said second stop portion, said first stop portion having a first magnet disposed therein and exposed on one side thereof, said second stop portion having a second magnet disposed therein and exposed on one side thereof, said bearing installed in said base such that said rotation stop is bound by a first wall and a second wall; and a reflector assembly mover that moves said movable reflector assembly to a first position or a second position, said movable reflector assembly being between said first input fiber and said second input fiber when in said first position so that a light signal transmitted from said first input fiber through said GRIN lens on said first input fiber is reflected to said GRIN lens on said first output fiber;

said reflector assembly mover comprises:

a first soft iron having a first wire wound thereon, said first soft iron extending into said base from said first end of said base;

a second soft iron having a second wire wound thereon, said second soft iron extending into said base from said first end of said base and being substantially parallel to said first soft iron;

a third soft iron having a third wire wound thereon, said third soft iron extending into said base from said second end of said base; and a third magnet disposed in said first wall of said base and being substantially opposite said first magnet.

2. The fiber optic switch of claim 1 wherein said first wire and said second wire are in parallel circuit configuration and said third wire is in series with said first and second wires.

3. A two-by-two fiber optic switch comprising:

a first input fiber, a second input fiber, a first output fiber and a second output fiber, said first input fiber being arranged so that it is collinear with said second output fiber and adjacent and parallel to said first output fiber, said second input fiber being arranged so that it is collinear with said first output fiber and adjacent and parallel to said second is output fiber;

a grade reflective index (GRIN) lens disposed on said first input fiber, said second input fiber, said first output fiber and said second output fiber;

a reflector assembly comprising a first mirror, a second mirror and a platform, said first mirror and said second mirror having front surface coating and said first mirror and said second mirror each having triangle shape with an input mirror surface and an output mirror surface, said platform comprising a member that extends to a distal end which is rotatably mounted about a bearing, said reflector assembly also having a stopper comprising a first portion with a first magnet disposed therein and a second portion with a second magnet disposed therein, said second portion deflected from said first portion;

a base having a first end and a second end;

a first iron extending into said base from said first end of said base and being substantially opposite a pole of said first magnet having first magnetic polarity;

a second iron extending into said base from said first end of said base and being substantially opposite a pole of said second magnet having a first magnetic polarity, said second iron substantially parallel to said first iron;

a third iron extending into said base from said second end of said base, said third iron being substantially opposite a pole of said second magnet having a second magnetic polarity;

a third magnet disposed in a first wall of said base, a pole of said third magnet having a second magnetic polarity being substantially opposite a pole of said first magnet having a second magnetic polarity;

a first wire wound about said first iron, a second wire wound about said second iron and a third wire would about said third iron, said first wire and said second wire in parallel circuit configuration and said third wire in series circuit configuration with said first and second wires, so that an electric current applied to said first, second and third wires will produce magnetic fields in said first iron, said second iron and said third iron capable of pushing said first magnet and said second magnet, thereby causing said rotation stop to rotate about said bearing and causing second portion of said rotation stop to rest against said second wall.

4. A fiber optic switch comprising:

a base having a first end and a second end;

a first input fiber, a second input fiber, a first output fiber and a second output fiber, said first input fiber being arranged so that it is substantially collinear with said second output fiber and adjacent and substantially parallel to said first output fiber, said second input fiber being arranged so that it is substantially collinear with said first output fiber and adjacent and substantially parallel to said second output fiber;

a grade reflective index (GRIN) lens disposed on said first input fiber, said second input fiber, said first output fiber and said second output fiber;

a movable reflector assembly installed to said base, said movable reflector assembly comprising:

a first reflector and a second reflector disposed on a reflector base, said reflector base extending axially to a downwardly extending support, said support rotatably mounted to a bearing, said bearing mounted to said base, said first reflector and said second reflector comprising a first reflector-first reflector surface, a first reflector-second reflector surface, a second reflector-first reflector surface and a second reflector-second reflector surface, wherein said first reflector-first reflector surface and said first reflector-second reflector surface have an angle of X degrees between them and wherein said second reflector-first reflector surface and said second reflector-second reflector surface have and angle of one-hundred eighty degrees minus X degrees between them so that said first reflector-second reflector surface and said second reflector-first reflector surface are disposed at ninety degree angles and said first reflector-first reflector surface and said second reflector-second reflector surface are also disposed at ninety degree angles;

said movable reflector assembly further comprising a rotation stop mounted about said support, said rotation stop having a first stop portion and a second stop portion, said first stop portion deflected from said second stop portion, said first stop portion having a first magnet disposed therein and exposed on one side thereof, said second stop portion having a second magnet disposed therein and exposed on one side thereof, said bearing installed in said base such that said rotation stop is bound by a first wall and a second wall; and a reflector assembly mover that moves said movable reflector assembly to a first position or a second position, said movable reflector assembly being between said first input fiber and said second input fiber when in said first position so that a light signal transmitted from said first input fiber through said GRIN lens on said first input fiber is reflected to said GRIN lens on said first output fiber;

said reflector assembly mover comprises:

a first soft iron having a first wire wound thereon, said first soft iron extending into said base from said first end of said base;

a second soft iron having a second wire wound thereon, said second soft iron extending into said base from said first end of said base and being substantially parallel to said first soft iron;

a third soft iron having a third wire wound thereon, said third soft iron extending into said base from said second end of said base; and a fourth soft iron having a fourth wire wound thereon, said fourth soft iron extending into said base from said second end of said base.

5. The fiber optic switch of claim 4 wherein said first wire and said third wire are in series circuit configuration, said second wire and said fourth wire are in series circuit configuration, and said first wire and said third wire are in parallel circuit configuration with said second wire and said fourth wire.

6. A two-by-two fiber optic switch comprising:

a first input fiber, a second input fiber, a first output fiber and a second output fiber, said first input fiber being arranged so that it is collinear with said second output fiber and adjacent and parallel to said first output fiber, said second input fiber being arranged so that it is collinear with said first output fiber and adjacent and parallel to said second output fiber;

a grade reflective index (GRIN) lens disposed on said first input fiber, said second input fiber, said first output fiber and said second output fiber;

a reflector assembly comprising a first mirror, a second mirror and a platform, said first mirror and said second mirror having front surface coating and said first mirror and said second mirror each having triangle shape with an input mirror surface and an output mirror surface, said platform comprising a member that extends to a distal end which is rotatably mounted about a bearing, said reflector assembly also having a stopper comprising a first portion with a first magnet disposed therein and a second portion with a second magnet disposed therein, said second portion deflected from said first portion;

a base having a first end and a second end;

a first iron extending into said base from said first end of said base and being substantially opposite a pole of said first magnet having first magnetic polarity;

a second iron extending into said base from said first end of said base and being substantially opposite a pole of said second magnet having a first magnetic polarity, said second iron substantially parallel to said first iron;

a third iron extending into said base from said second end of said base, said third iron being substantially opposite a pole of said second magnet having a second magnetic polarity;

a fourth iron extending into said base from said second end of said base, said third iron being substantially opposite a pole of said first magnet having a second magnetic polarity; and a first wire wound about said first iron, a second wire wound about said second iron, a third wire would about said third iron and a fourth wire wound about said fourth iron, said first wire and said third wire in series circuit configuration, said second wire and said fourth wire in series circuit configuration, and said first wire and said third wire in parallel circuit configuration with said second wire and said fourth wire so that an electric current applied to said first, second, third and fourth wires will produce magnetic fields in said first iron, said second iron and said third iron capable of pushing or pulling said first magnet and said second magnet, thereby causing said rotation stop to rotate about said bearing, thereby placing said reflector assembly in a first position when said first portion of said stopper rests against said second wall, and placing said reflector assembly in a second position when said second portion of said stopper rests against said second wall, said reflector assembly being between said first input fiber and said second input fiber when in said first position so that a light signal transmitted from said first input fiber through said GRIN lens on said first input fiber, hits said first mirror, reflects to said second mirror, and then reflects to said GRIN lens on said first output fiber.

* * * * *

UNITED STATES PATENT AND TRADEMARK OFFICE
CERTIFICATE OF CORRECTION

PATENT NO. : 5,642,446
DATED : June 24, 1997
INVENTOR(S) : Jian-Hung Tsai

It is certified that error appears in the above-identified patent and that said Letters Patent is hereby corrected as shown below:

Column 16, line 7, please delete "18-23" and insert --18-24--.

Column 16, line 50, after "such" and insert --that--.

Column 18, line 53, please delete "18-23" and insert --18-24--.

Column 20, line 32, please delete "18-23" and insert --18-24--.

Column 20, line 61, please delete "772" and insert --774--.

Column 22, line 18, please delete "18-22" and insert --18-24--.

Column 26, line 25, please after "such" insert --that--.

Signed and Sealed this

Twenty-third Day of February, 1999

Q. TODD DICKINSON

*Attest:*

*Attesting Officer*     *Acting Commissioner of Patents and Trademarks*